US011601820B2

(12) United States Patent
Lei

(10) Patent No.: US 11,601,820 B2
(45) Date of Patent: Mar. 7, 2023

(54) BROADCAST CONTROL CHANNEL FOR SHARED SPECTRUM

(71) Applicant: QUALCOMM Incorporated, San Diego, CA (US)

(72) Inventor: Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/880,096

(22) Filed: Jan. 25, 2018

(65) Prior Publication Data

US 2018/0220305 A1 Aug. 2, 2018

Related U.S. Application Data

(60) Provisional application No. 62/451,579, filed on Jan. 27, 2017.

(51) Int. Cl.
*H04W 16/14* (2009.01)
*H04W 72/00* (2023.01)
(Continued)

(52) U.S. Cl.
CPC .......... *H04W 16/14* (2013.01); *H04L 5/0053* (2013.01); *H04W 72/005* (2013.01);
(Continued)

(58) Field of Classification Search
None
See application file for complete search history.

(56) References Cited

U.S. PATENT DOCUMENTS 5,546,464 A * 8/1996 Raith ................ H04L 9/12
380/260
6,105,060 A * 8/2000 Rothblatt ........... H04B 7/18584
709/219
(Continued)

FOREIGN PATENT DOCUMENTS

CN 101390425 A 3/2009
CN 101626280 A 1/2010
(Continued)

OTHER PUBLICATIONS

Ericsson: "Summary of e-mail Discussions on Downlink Control Signaling", 3GPP Draft; R1-1612908, Summary of e-Mail Discussion On Downlink Control Siganling, 3rd Generation Partnership Project (3GPP), Mobile Competence Centre, 650 Route Des Lucioles, F-06921, Sophia-Antipo, vol. RAN WG1, No. Reno, NV, USA, Nov. 14, 2016-Nov. 18, 2016, Nov. 13, 2016 (Nov. 13, 2016), XP051190931, Retrieved from the Internet: URL:http://www.3gpp.org/ftp/tsg_ran/WG1_RL 1/TSGR1_87/Docs/, 37 pages, [retrieved on Nov. 13, 2016].
(Continued)

*Primary Examiner* — Andrew C Oh
(74) *Attorney, Agent, or Firm* — Arun Swain; Loza & Loza LLP

(57) ABSTRACT

Aspects of the disclosure relate to wireless communication over a shared spectrum carrier utilizing a broadcast, common control channel. The broadcast control channel may be multiplexed with a unicast control channel. Further, a scheduling entity may allocate a semi-static set of resources for the broadcast control channel, providing a shared search space on the shared spectrum carrier. The resource allocation for the shared search space may be based on one or more parameters, which may be cell-specific parameters. This shared search space may include resources distributed across the shared spectrum carrier, or a contiguous set of resources (Continued)

that spans only a portion of the carrier. The broadcast control channel may be configured for high reliability, and may carry time-critical control information relating to access control for the shared spectrum carrier. Other aspects, embodiments, and features are also claimed and described.

32 Claims, 18 Drawing Sheets

(51) Int. Cl.
    *H04W 72/04*         (2023.01)
    *H04L 5/00*          (2006.01)
    *H04B 7/0413*       (2017.01)

(52) U.S. Cl.
    CPC ......... *H04W 72/042* (2013.01); *H04B 7/0413* (2013.01); *H04L 5/0037* (2013.01); *H04L 5/0092* (2013.01)

(56) References Cited

U.S. PATENT DOCUMENTS

| | | | |
|---|---|---|---|
| 8,867,519 B2 * | 10/2014 | Kim | H04W 72/1278 370/349 |
| 9,106,378 B2 | 8/2015 | Luo et al. | |
| 9,125,133 B2 | 9/2015 | Ji et al. | |
| 9,247,538 B2 | 1/2016 | Lin et al. | |
| 9,774,436 B2 | 9/2017 | Jeon et al. | |
| 10,548,129 B2 * | 1/2020 | Fwu | H04W 72/044 |
| 10,652,768 B2 * | 5/2020 | Xu | H04W 4/70 |
| 2003/0117980 A1 * | 6/2003 | Kim | H04W 36/0094 370/332 |
| 2006/0109890 A1 | 5/2006 | Willenegger | |
| 2007/0104151 A1 * | 5/2007 | Papasakellariou | G06Q 40/00 370/335 |
| 2009/0073929 A1 * | 3/2009 | Malladi | H04L 5/0023 370/329 |
| 2010/0027471 A1 * | 2/2010 | Palanki | H04B 7/0413 370/328 |
| 2010/0272021 A1 * | 10/2010 | Kopplin | H04W 92/045 370/328 |
| 2011/0085458 A1 * | 4/2011 | Montojo | H04L 1/0038 370/252 |
| 2011/0110441 A1 * | 5/2011 | Chen | H04L 5/0037 375/295 |
| 2011/0164659 A1 * | 7/2011 | Kawamura | H04W 52/42 375/E1.034 |
| 2011/0176629 A1 * | 7/2011 | Bayesteh | H04B 7/0632 375/267 |
| 2011/0194510 A1 * | 8/2011 | Gaal | H04L 27/361 370/329 |
| 2011/0199987 A1 * | 8/2011 | Rommer | H04L 61/30 370/329 |
| 2011/0228732 A1 * | 9/2011 | Luo | H04L 1/0045 370/329 |
| 2011/0275338 A1 * | 11/2011 | Seshadri | H04L 25/03834 455/205 |
| 2011/0286558 A1 * | 11/2011 | Abrishamkar | H04L 25/0234 375/346 |
| 2011/0292875 A1 * | 12/2011 | Luo | H04B 1/7107 370/328 |
| 2011/0299513 A1 * | 12/2011 | Suzuki | H04L 5/0007 370/338 |
| 2012/0275365 A1 | 11/2012 | Anderson et al. | |
| 2012/0300686 A1 | 11/2012 | Maeda et al. | |
| 2013/0010732 A1 * | 1/2013 | Kawasaki | H04W 72/0453 370/329 |
| 2013/0021948 A1 * | 1/2013 | Moulsley | H04W 72/0406 370/254 |
| 2013/0039291 A1 * | 2/2013 | Blankenship | H04L 5/0055 370/329 |
| 2013/0058240 A1 * | 3/2013 | Kim | H04L 5/0053 370/252 |
| 2013/0064099 A1 * | 3/2013 | Kim | H04L 5/0053 370/241 |
| 2013/0064216 A1 * | 3/2013 | Gao | H04L 5/0055 370/329 |
| 2013/0070692 A1 * | 3/2013 | Miki | H04L 5/001 370/329 |
| 2013/0114419 A1 * | 5/2013 | Chen | H04W 72/044 370/312 |
| 2013/0114495 A1 * | 5/2013 | Chen | H04L 1/0013 370/312 |
| 2013/0121185 A1 * | 5/2013 | Li | H04B 7/0617 370/252 |
| 2013/0121295 A1 * | 5/2013 | Saito | H04L 5/0051 370/329 |
| 2013/0163530 A1 * | 6/2013 | Chen | H04L 25/0202 370/329 |
| 2013/0194931 A1 * | 8/2013 | Lee | H04W 72/04 370/329 |
| 2013/0235812 A1 | 9/2013 | Heo et al. | |
| 2013/0322343 A1 * | 12/2013 | Seo | H04W 24/02 370/328 |
| 2014/0003349 A1 * | 1/2014 | Kang | H04W 72/042 370/328 |
| 2014/0036810 A1 | 2/2014 | Harrison et al. | |
| 2014/0036813 A1 * | 2/2014 | Lunttila | H04L 5/0091 370/329 |
| 2014/0044057 A1 * | 2/2014 | Gaal | H04L 5/0025 370/329 |
| 2014/0044070 A1 * | 2/2014 | Chen | H04B 7/0632 370/329 |
| 2014/0050187 A1 * | 2/2014 | Nakshima | H04L 25/03898 370/329 |
| 2014/0050206 A1 * | 2/2014 | Seo | H04J 11/0069 370/336 |
| 2014/0064235 A1 * | 3/2014 | Seo | H04W 72/0406 370/329 |
| 2014/0071934 A1 * | 3/2014 | Frenne | H04L 5/0037 370/329 |
| 2014/0086173 A1 | 3/2014 | Sadeghi et al. | |
| 2014/0105151 A1 * | 4/2014 | Hong | H04L 5/0053 370/329 |
| 2014/0112242 A1 * | 4/2014 | Vilmur | H04B 7/2606 370/327 |
| 2014/0141787 A1 * | 5/2014 | Marque-Pucheu | H04W 72/005 455/447 |
| 2014/0198874 A1 | 7/2014 | Kim et al. | |
| 2014/0219196 A1 * | 8/2014 | Patel | H04L 1/1812 370/329 |
| 2014/0286284 A1 * | 9/2014 | Lim | H04W 76/14 370/329 |
| 2014/0293971 A1 * | 10/2014 | Yoo | H04W 72/1226 370/336 |
| 2014/0329553 A1 * | 11/2014 | Nakashima | H04W 52/365 455/522 |
| 2015/0003405 A1 | 1/2015 | Liao et al. | |
| 2015/0103777 A1 | 4/2015 | Chen et al. | |
| 2015/0180621 A1 * | 6/2015 | Guan | H04L 5/0055 370/330 |
| 2015/0188684 A1 * | 7/2015 | Takeda | H04W 72/042 370/329 |
| 2015/0195069 A1 * | 7/2015 | Yi | H04L 5/0053 370/329 |
| 2015/0282213 A1 * | 10/2015 | Sun | H04W 72/0413 370/329 |
| 2015/0327224 A1 * | 11/2015 | Guan | H04L 45/02 370/329 |
| 2015/0365931 A1 * | 12/2015 | Ng | H04L 1/1887 370/329 |
| 2016/0006521 A1 * | 1/2016 | Yoshimoto | H04B 7/0452 375/267 |
| 2016/0007371 A1 * | 1/2016 | Pietraski | H04W 72/046 370/315 |
| 2016/0037550 A1 * | 2/2016 | Barabell | H04W 72/1263 455/450 |
| 2016/0043849 A1 | 2/2016 | Lee et al. | |

(56) References Cited

U.S. PATENT DOCUMENTS

| | | | |
|---|---|---|---|
| 2016/0080045 A1 | 3/2016 | Dinan | |
| 2016/0112169 A1* | 4/2016 | Yerramalli | H04W 24/08 370/252 |
| 2016/0119900 A1* | 4/2016 | You | H04L 5/0094 370/336 |
| 2016/0164653 A1* | 6/2016 | Wang | H04L 5/0048 370/329 |
| 2016/0205664 A1 | 7/2016 | Zhang et al. | |
| 2016/0234454 A1* | 8/2016 | Kwon | H04N 21/44209 |
| 2016/0234841 A1* | 8/2016 | Pao | H04W 16/14 |
| 2016/0309282 A1* | 10/2016 | Xu | H04W 24/08 |
| 2017/0048829 A1* | 2/2017 | Kim | H04L 5/0092 |
| 2017/0093620 A1* | 3/2017 | Um | H04L 5/0048 |
| 2017/0163484 A1* | 6/2017 | Hou | H03F 3/189 |
| 2017/0202022 A1* | 7/2017 | Chendamarai Kannan | H04W 74/006 |
| 2017/0207815 A1* | 7/2017 | Chae | H04L 5/00 |
| 2017/0208574 A1* | 7/2017 | Ramakrishna | H04B 7/15528 |
| 2017/0230956 A1* | 8/2017 | Kim | H04B 1/713 |
| 2017/0251454 A1* | 8/2017 | Yang | H04B 7/26 |
| 2017/0257846 A1* | 9/2017 | Kim | H04L 5/0012 |
| 2017/0280479 A1* | 9/2017 | Frenne | H04W 48/08 |
| 2017/0289818 A1* | 10/2017 | Ng | H04L 5/001 |
| 2017/0289937 A1* | 10/2017 | Urabayashi | H04W 56/0015 |
| 2017/0290016 A1 | 10/2017 | Yi et al. | |
| 2017/0295601 A1* | 10/2017 | Kim | H04L 5/0092 |
| 2017/0303247 A1* | 10/2017 | Yasukawa | H04L 5/0053 |
| 2017/0318564 A1* | 11/2017 | Lee | H04L 5/0087 |
| 2017/0332288 A1* | 11/2017 | Sadek | H04W 36/0069 |
| 2017/0347341 A1* | 11/2017 | Zhang | H04L 12/189 |
| 2017/0374569 A1* | 12/2017 | Lee | H04W 72/085 |
| 2018/0019842 A1* | 1/2018 | Fu | H04L 5/0055 |
| 2018/0069516 A1* | 3/2018 | Nentwig | H03F 1/0277 |
| 2018/0124727 A1* | 5/2018 | Baldemair | H04L 5/0053 |
| 2018/0175975 A1* | 6/2018 | Um | H04W 16/14 |
| 2018/0176892 A1* | 6/2018 | Kim | H04W 52/386 |
| 2018/0198594 A1* | 7/2018 | Tiirola | H04L 5/005 |
| 2018/0205399 A1* | 7/2018 | Baringer | H04B 1/001 |
| 2018/0205437 A1* | 7/2018 | Kim | H04B 7/0639 |
| 2018/0241502 A1 | 8/2018 | Beale et al. | |
| 2018/0242283 A1* | 8/2018 | Feng | H04W 74/0808 |
| 2018/0254853 A1* | 9/2018 | Jung | H04L 5/0051 |
| 2018/0255534 A1* | 9/2018 | Wang | H04W 72/044 |
| 2018/0278355 A1* | 9/2018 | Shin | H04L 5/0048 |
| 2018/0352500 A1* | 12/2018 | Baldemair | H04L 5/0057 |
| 2018/0359790 A1* | 12/2018 | Ingale | H04W 8/22 |
| 2019/0007923 A1* | 1/2019 | Blankenship | H04L 5/0073 |
| 2019/0013846 A1* | 1/2019 | Zhang | H04B 7/06 |
| 2019/0028243 A1* | 1/2019 | Kim | H04L 27/2613 |
| 2019/0045505 A1* | 2/2019 | Yang | H04W 72/0446 |
| 2019/0132029 A1* | 5/2019 | Sun | H04B 7/0695 |
| 2019/0229825 A1* | 7/2019 | Ahn | H04L 5/0098 |
| 2019/0342915 A1* | 11/2019 | Kim | H04W 72/0406 |

FOREIGN PATENT DOCUMENTS

| | | |
|---|---|---|
| CN | 103178948 A | 6/2013 |
| CN | 103404046 A | 11/2013 |
| CN | 105873225 A | 8/2016 |
| GB | 2491401 A | 12/2012 |
| WO | 2011019972 A1 | 2/2011 |
| WO | WO-2017212456 A1 | 12/2017 |

OTHER PUBLICATIONS

Ericsson: "On Broadcasted Control Channels", 3GPP Draft; R1-1612910 On Broadcast Control Channels, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016 (Nov. 13, 2016), XP051176851, 1 page, Retrieved from the Internet: URL: http://www.3gpp.org/ftp/Meetings_3GPP_SYNC/RAN1/Docs/ [retrieved on Nov. 13, 2016].

International Search Report and Written Opinion—PCT/US2018/015577—ISA/EPO—dated Apr. 26, 2018.

NTT Docomo Inc: "DL Control Channel Design for NR", 3GPP Draft; R1-1612715, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18. 2016 Nov. 13, 2016, XP051176658, Retrieved from the Internet: URL:http//www.3gpp.org/ftp/Meetings_3GPP_SYNC/RAN1/Docs/ [retrieved on Nov. 13, 2016], 5 pages.

Institute for Information Industry (III): "PDSCH Coverage Improvement for MTC with Convolutional Coded", 3GPP TSG RAN WG1 Meeting #73, R1-132536, Fukuoka, Japan, May 20-May 24, 2013, 3 Pages.

Taiwan Search Report—TW107102857—TIPO—dated Aug. 3, 2021.

* cited by examiner

| Information Elements | Duplexing Mode (TDD, FDD) ⌒602 | Link Direction (DL, UL) ⌒604 | Indication of Almost Blank Slot ⌒606 | Numerology ⌒608 | Medium Reservation Information ⌒610 | Minimum SIB ⌒612 | CRC ⌒614 |
|---|---|---|---|---|---|---|---|
| Number of Bits | 1 | 1 | 1 | 1 | Configurable | Configurable | 1 |

Broadcast Control Channel Payload

FIG. 6

BROADCAST CONTROL CHANNEL FOR SHARED SPECTRUM

PRIORITY CLAIM

This application claims priority to and the benefit of provisional patent application No. 62/451,579, titled, "BROADCAST PHYSICAL CONTROL CHANNEL" and filed in the United States Patent and Trademark Office on Jan. 27, 2017, the entire content of which is incorporated herein by reference as if fully set forth below in its entirety and for all applicable purposes.

TECHNICAL FIELD

The technology discussed below relates generally to wireless communication systems, and more particularly, to transmission and reception of a physical broadcast control channel. Embodiments can provide and enable techniques for communication via a shared spectrum carrier.

INTRODUCTION

In a wireless communication network, communication between different nodes generally includes control information and user data information. In 4G and 5G cellular networks, some control information may be broadcast over an entire cell, e.g., utilizing a physical broadcast channel (PBCH); while other control information may include unicast transmissions intended for specific receiving devices within the cell, e.g., utilizing a physical downlink control channel (PDCCH). These networks have additionally introduced a further broadcast control channel, called a "common" control channel in 4G and "group-common" control channel in 5G. This broadcast control channel is used for broadcasting control information that is common to all synchronized devices in a cell. Because these broadcast control channels utilize coherent modulation to send their control information, certain reference signals are transmitted together with this control information to enable coherent demodulation.

Wireless communication systems in general operate using portions of the radio spectrum following requirements set forth by a local regulatory body, such as the US Federal Communications Commission (FCC). Within this spectrum, access to some bands may be prohibited to anyone other than those who purchase a license (e.g., licensed bands). Other bands might have their use essentially unrestricted, although usually still subject to rules about the transmissions to reduce interference to others using that band (e.g., unlicensed bands). For example, cellular networks typically operate on licensed bands, while Wi-Fi, cordless home phones, remote keyless entry, and home automation/security devices typically operate on unlicensed bands.

In unlicensed bands, some of which may be referred to as "shared spectrum," one radio access technology (RAT) generally can't predict whether other networks, technologies, or devices will be using the band. Thus, the freedom to schedule resources is somewhat restricted, and contention-based channel access mechanisms, such as a carrier sense, listen-before-talk algorithm may be used. As interest in the use of such shared spectrum increases, any improvement to access control for a shared spectrum carrier is highly desired.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for wireless communication over a shared spectrum carrier by utilizing a broadcast, common control channel, which may be multiplexed with a unicast control channel. The broadcast control channel may be allocated to resources in a semi-static search space based on one or more parameters such as an index (e.g., wherein the index may be based on a cell ID, a reuse factor, etc.), the system bandwidth, a subframe number, or others. Aspects of the disclosure provide for a scheduling entity to broadcast the common control channel over a distributed search space, and a localized search space.

Further aspects of the disclosure present various modulation and coding schemes for the broadcast control channel, including the use of a sequence-based mapping combined with resource block level error correction coding, the use of coherent modulation combined with bit level error correction coding, and the use of differential modulation. Still further, characteristics and contents of the payload of an exemplary broadcast control channel are provided.

In one example a method of wireless communication over a shared spectrum carrier is disclosed. The method, which is operable at a scheduling entity, includes transmitting downlink control information in one or more slots on the shared spectrum carrier. The downlink control information includes a unicast control channel having at least one control channel element directed to a specific receiving device, and a broadcast control channel having common control information relating to access control for the shared spectrum carrier.

In another example an apparatus configured for wireless communication over a shared spectrum carrier is disclosed. The apparatus includes a transceiver configured for transmitting a unicast control channel multiplexed with a broadcast control channel over one or more slots on the shared spectrum carrier, and a processor communicatively coupled to the transceiver. The processor is configured to utilize the transceiver to send at least one control channel element directed to a specific receiving device over the unicast control channel, and to broadcast common control information relating to access control for the shared spectrum carrier over the broadcast control channel.

In another example a method of wireless communication with a cell over a shared spectrum carrier is disclosed. The method, which is operable at a scheduled entity, includes receiving downlink control information in one or more slots on the shared spectrum carrier. Here, the downlink control information includes a unicast control channel having at least one control channel element directed to a specific receiving device, and a broadcast control channel having common control information relating to access control for the shared spectrum carrier.

In another example an apparatus configured for wireless communication over a shared spectrum carrier is disclosed. The apparatus includes a transceiver configured for receiving a unicast control channel multiplexed with a broadcast control channel over one or more slots on the shared spectrum carrier. The apparatus further includes a processor communicatively coupled to the transceiver, wherein the processor is configured to utilize the transceiver to receive at least one control channel element directed to a specific receiving device over the unicast control channel, and to receive common control information relating to access control for the shared spectrum carrier over the broadcast control channel.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 6 is a schematic illustration of a payload of a broadcast control channel according to an example aspect of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
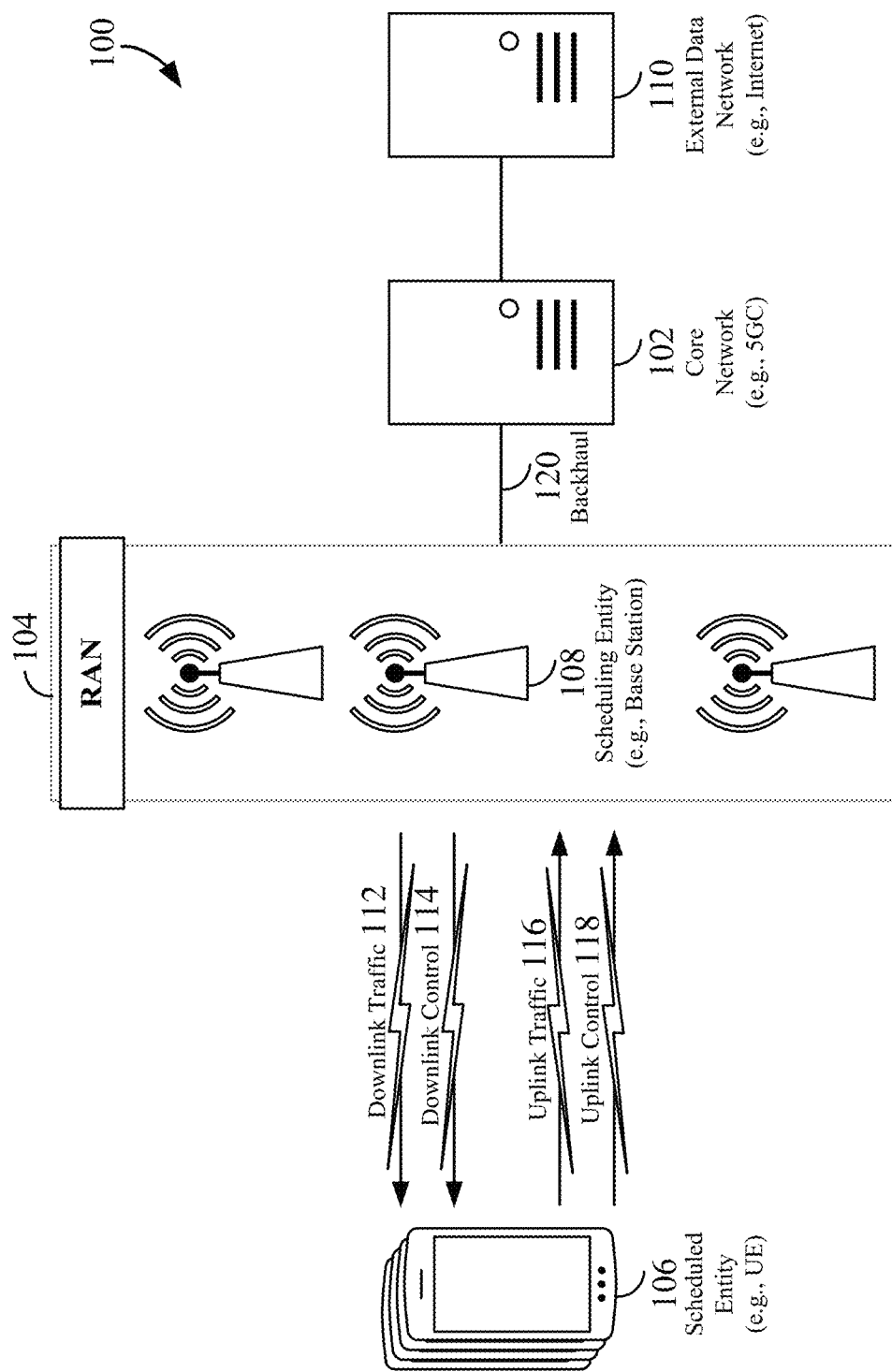
FIG. 1 is a schematic illustration of an example of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 and/or downlink control information 114 to one or more scheduled entities 106. The downlink traffic 112 may generally include user data carried on one or more traffic channels (e.g., PDSCH), while the downlink control 114 may generally include control information carried on one or more control channels (e.g., PDCCH). In some examples, described further below, the downlink control 114 may include information relating to the status of a shared spectrum carrier, such as medium reservation information. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
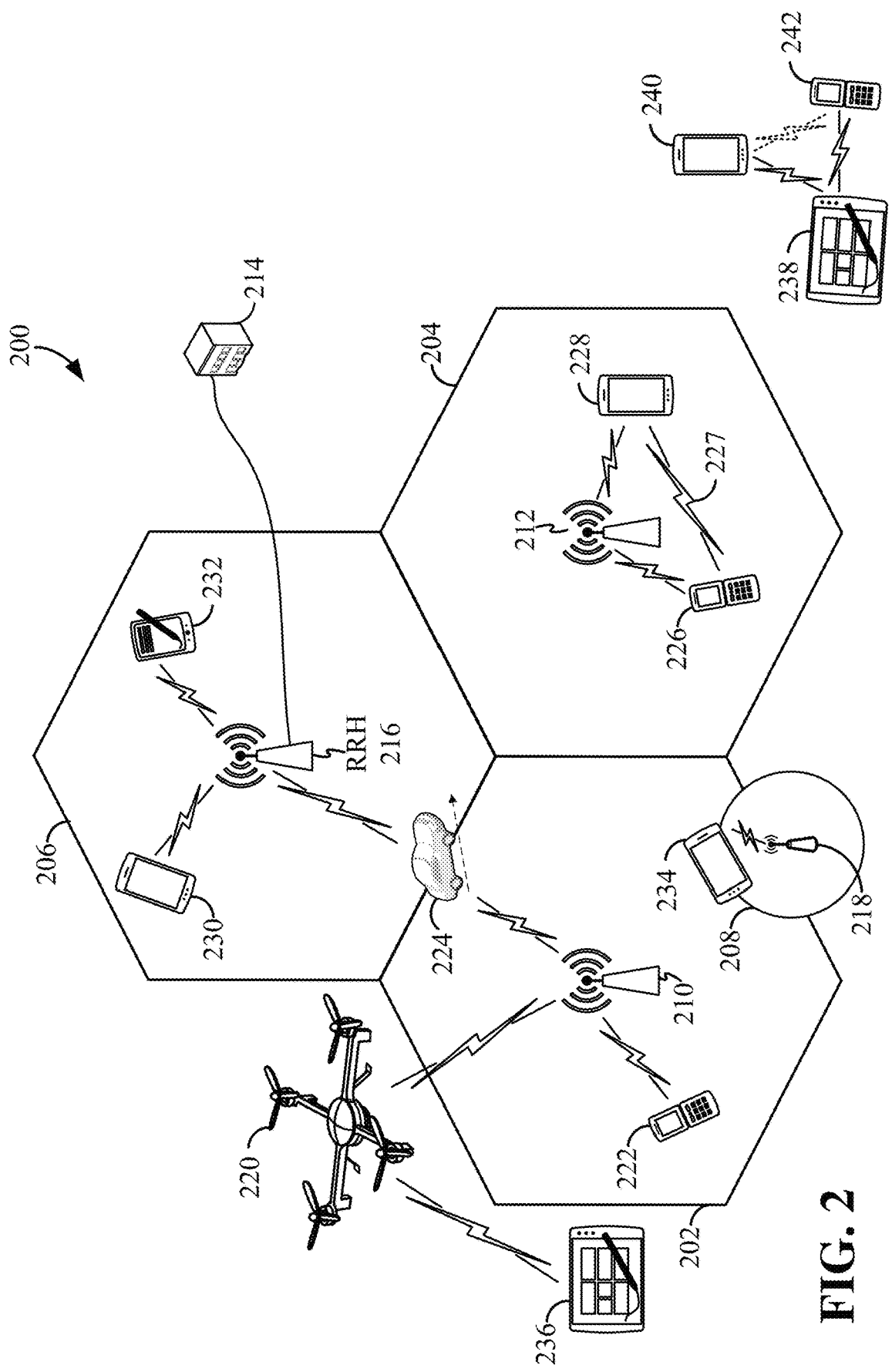
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In some examples, transmissions over the air interface may be subjected to precoding, for beamforming and/or MIMO. Beamforming refers to directional signal transmission or reception. For a beamformed transmission, the amplitude and phase of each antenna in an array of antennas may be precoded, or controlled to create a desired (e.g., directional) pattern of constructive and destructive interference in the wavefront. MIMO refers to multiple-input multiple-output signals. MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another.

Single-user MIMO refers to a scheme where the transmitter sends one or more streams to the same receiver, taking advantage of capacity gains associated with using multiple Tx, Rx antennas in rich scattering environments where channel variations can be tracked. The receiver may track these channel variations and provide corresponding feedback to the transmitter. This feedback may include channel quality information (CQI), the number of preferred data streams (e.g., rate control, a rank indicator (RI)), and a precoding matrix index (PMI). Multi-user MIMO (MU-MIMO) is a multi-antenna technology where base station, in communication with a large number of UEs, can exploit multipath signal propagation to increase overall network capacity by increasing throughput and spectral efficiency, and reducing the required transmission energy. Here, the transmitter may attempt to increase the capacity by transmitting to multiple users using its multiple transmit antennas at the same time, and also using the same allocated time-frequency resources. The receiver may transmit feedback including a quantized version of the channel so that the transmitter can schedule the receivers with good channel separation. The transmitted data is precoded to maximize throughput for users and minimize inter-user interference.

In order for transmissions over the radio access network 104/200 to obtain a low block error rate (BLER) while still achieving very high data rates, channel coding may be used. That is, wireless communication may generally utilize a suitable error correcting block code. In a typical block code, an information message is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is encoded using quasi-cyclic low-density parity check (LDPC) with two different base graphs: one base graph is used for large code blocks and/or high code rates, while the other base graph is used otherwise. Control information and the physical broadcast channel (PBCH) are coded using polar coding. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

An OFDM air interface may be defined according to a two-dimensional grid of resource elements, defined by separation of resources in frequency by defining a set of closely spaced frequency tones or sub-carriers, and separation in time by defining symbols having a given duration. By setting the spacing between the tones based on the symbol rate, inter-symbol interference can be reduced or eliminated. OFDM channels provide for high data rates by allocating a data stream in a parallel manner across multiple subcarriers.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, to be consistent with 5G NR specifications, a frame may refer to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

With an OFDM carrier, the numerology of the carrier refers to a certain set of parameters that characterize the carrier, such as the subcarrier spacing, the OFDM symbol duration, and the cyclic prefix (CP) length. In order to maintain orthogonality of the subcarriers or tones, the subcarrier spacing is equal to the inverse of the symbol period. A scalable numerology refers to the capability of the network to select different subcarrier spacings, and accordingly, with each spacing, to select the corresponding symbol period. The symbol period should be short enough that the channel does not significantly vary over each period, in order to preserve orthogonality and limit inter-subcarrier interference.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
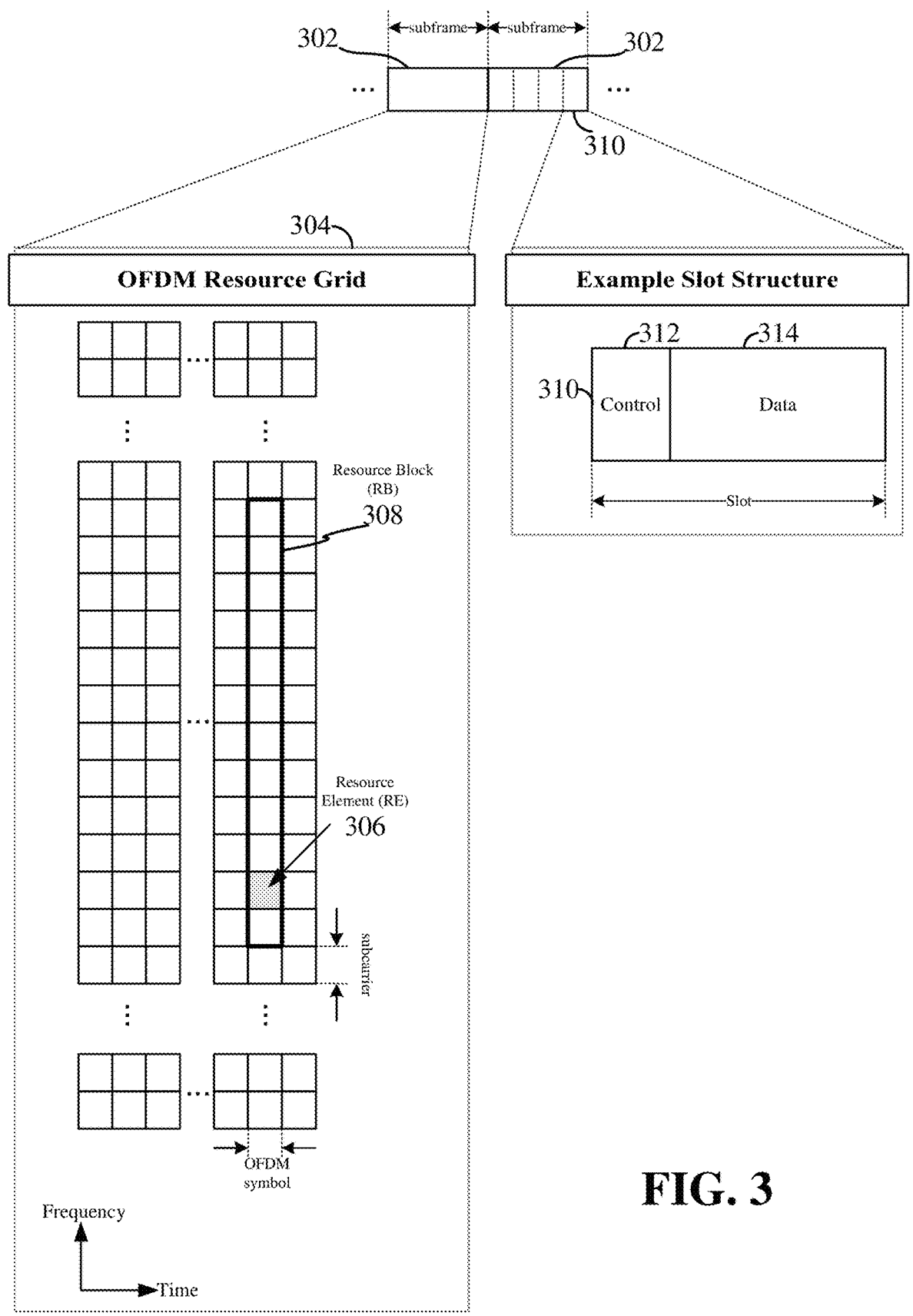
FIG. 3 is a schematic illustration of an example organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a physical broadcast channel (PBCH); a primary synchronization signal (PSS); a secondary synchronization signal (SSS); a physical control format indicator channel (PCFICH); a physical hybrid automatic repeat request (HARQ) indicator channel (PHICH); and/or a physical downlink control channel (PDCCH), etc., to one or more scheduled entities 106.

The PBCH may be configured to broadcast common control information to UEs within a cell, and the PDCCH may be configured to provide unicast control information, with control channel elements (CCEs) typically directed to a specific UE. Typically, the PBCH carries higher-layer information, such as the master information block (MIB), providing parameters to enable initial access to the cell. On the other hand, the PDCCH is configured to provide unicast lower-layer (e.g., PHY/MAC) control information to UEs within the cell. Furthermore, the CCEs carried on the PDCCH may utilize UE-specific precoding/beamforming to direct the transmission to the corresponding UE(s).

The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, a scheduling entity may allocate one or more REs 306 (e.g., within the data region 314) for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

Figure 4:
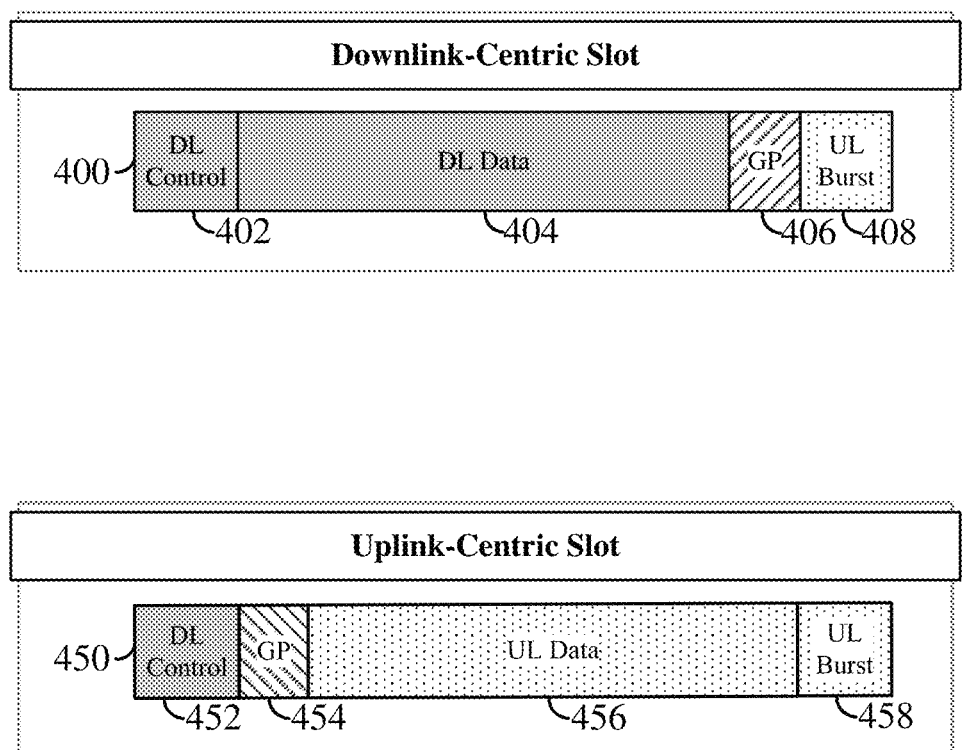
FIG. 4 is a schematic illustration of example time division duplex (TDD) slot structures.

Once again, the physical structure of the slot 310 described above is merely exemplary in nature, and within the scope of the present disclosure, the slot structure may take any of innumerable suitable formats. FIG. 4 provides a schematic illustration of two such exemplary slot structures for use on a TDD carrier according to some aspects of the present disclosure.

In the illustrated example, a DL-centric slot 400 may be a transmitter-scheduled slot. The nomenclature DL-centric generally refers to a structure wherein more resources are allocated for transmissions in the DL direction (e.g., transmissions from the scheduling entity 108 to the scheduled entity 106). Similarly, an UL-centric slot 450 may be a receiver-scheduled slot, wherein more resources are allocated for transmissions in the UL direction (e.g., transmissions from the scheduled entity 106 to the scheduling entity 108).

Each slot, such as the slots 400 and 450, may include transmit (Tx) and receive (Rx) portions. For example, in both the DL-centric slot 400 and the UL-centric slot 450, the scheduling entity 108 first has an opportunity to transmit control information in a DL control region 402 and 452, respectively. The DL control region may occupy the initial one or more OFDM symbols of slot. Typically, a predetermined, fixed set of resources within each DL control region carries broadcast control information on the PBCH, and the remainder of the DL control region carries unicast control information, e.g., on the PDCCH, as well as pilots or reference signals used to enable demodulation of the control data. In the DL-centric slot 400 the scheduling entity 108 next has an opportunity to transmit DL user data or traffic, e.g., on a PDSCH, in a DL data region 404. Following a guard period (GP) region 406 having a suitable duration, the scheduling entity 108 has an opportunity to receive UL data and/or UL feedback including any UL scheduling requests, CSF, a HARQ ACK/NACK, etc., in an UL burst 408 from other entities using the carrier.

The GP region 406 may be included to accommodate variability in UL and DL timing. For example, latency due to radio frequency (RF) antenna direction switching (e.g., from DL to UL) and transmission path latency may cause the scheduled entity 106 to transmit early on the UL to match DL timing. Such early transmission may interfere with symbols received from the scheduling entity 108. Accordingly, the GP region 406 may allow an amount of time after the DL data region 404 to prevent interference, where the GP region 406 provides an appropriate amount of time for the scheduling entity 108 to switch its RF antenna direction, an appropriate amount of time for the over-the-air (OTA) transmission, and an appropriate amount of time for ACK processing by the scheduled entity. The UL-centric slot 450 is substantially similar to the DL-centric slot 400, including a DL control region 452, a guard period 454, an UL data region 456, and an UL burst region 458.

In various implementations, the air interface in the radio access network 104/200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. For example, cellular networks typically operate on licensed bands, while Wi-Fi, cordless home phones, remote keyless entry, and home automation/security devices typically operate on unlicensed bands. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

For ease of description, in the disclosure that follows, the term 'shared spectrum,' and a shared spectrum carrier, should be understood to refer broadly to unlicensed spectrum, shared spectrum, and/or LSA spectrum.

When utilizing licensed spectrum, exclusive access to the spectrum by a given RAT can provide predictability and relative ease for devices to gain access to the air interface without worrying about collisions or the need to contend for resources. However, in unlicensed or shared spectrum, one RAT generally can't predict whether other networks, technologies, or devices will be using the band. Thus, the freedom to schedule resources is somewhat restricted, and contention-based channel access mechanisms, such as a carrier sense, listen-before-talk (LBT) algorithm may be used. LBT refers to a non-scheduled, contention-based multiple access technology where a device monitors or senses a carrier to determine if it is available before transmitting over the carrier. Some LBT technologies utilize signaling such as a request to send (RTS) and a clear to send (CTS) to reserve the channel for a given duration of time.

In 4G LTE networks and in 5G NR networks as they are currently defined for usage within licensed bands, there has been introduced a certain broadcast control channel. This broadcast control channel is generally referred to as a common control channel in LTE, and a group-common control channel in NR. These broadcast control channels are located in a common search space within a subframe or slot, which is monitored by all UEs served by a base station. The broadcast channel can be used for broadcasting control information that is common to all synchronized devices within a cell. As such, the broadcast control channel transmissions generally do not adopt any UE-specific transmission characteristics, such as precoding or beamforming. This contrasts with more conventional unicast PDCCH transmissions, where UE-specific precoding/beamforming may be used to direct the signal to the corresponding UE.

The waveform of these broadcast control channels in LTE and NR specifications utilize OFDM, and their symbol locations are pre-configured by the base station. Because they utilize OFDM, they rely on wideband CRS and DMRS reference signal transmissions sent together with the broadcast control channel to provide for coherent demodulation of the control information.

According to certain aspects of the present disclosure, a similar concept of a broadcast control channel may be adopted for use in a RAN that utilizes shared spectrum. By providing common control information to shared spectrum UEs, particular control information that would be beneficial to the use of the shared spectrum can be provided. For example, common control information broadcast to all users can better facilitate access control for the shared spectrum, which may involve LBT functions, device synchronization, and the conveyance of channel and/or system information to users sharing or attempting to access the unlicensed spectrum. Further discussion of the information that may be carried in a shared spectrum broadcast control channel is provided below, e.g., in connection with the exemplary broadcast control channel payload illustrated in FIG. 6.

Figure 5:
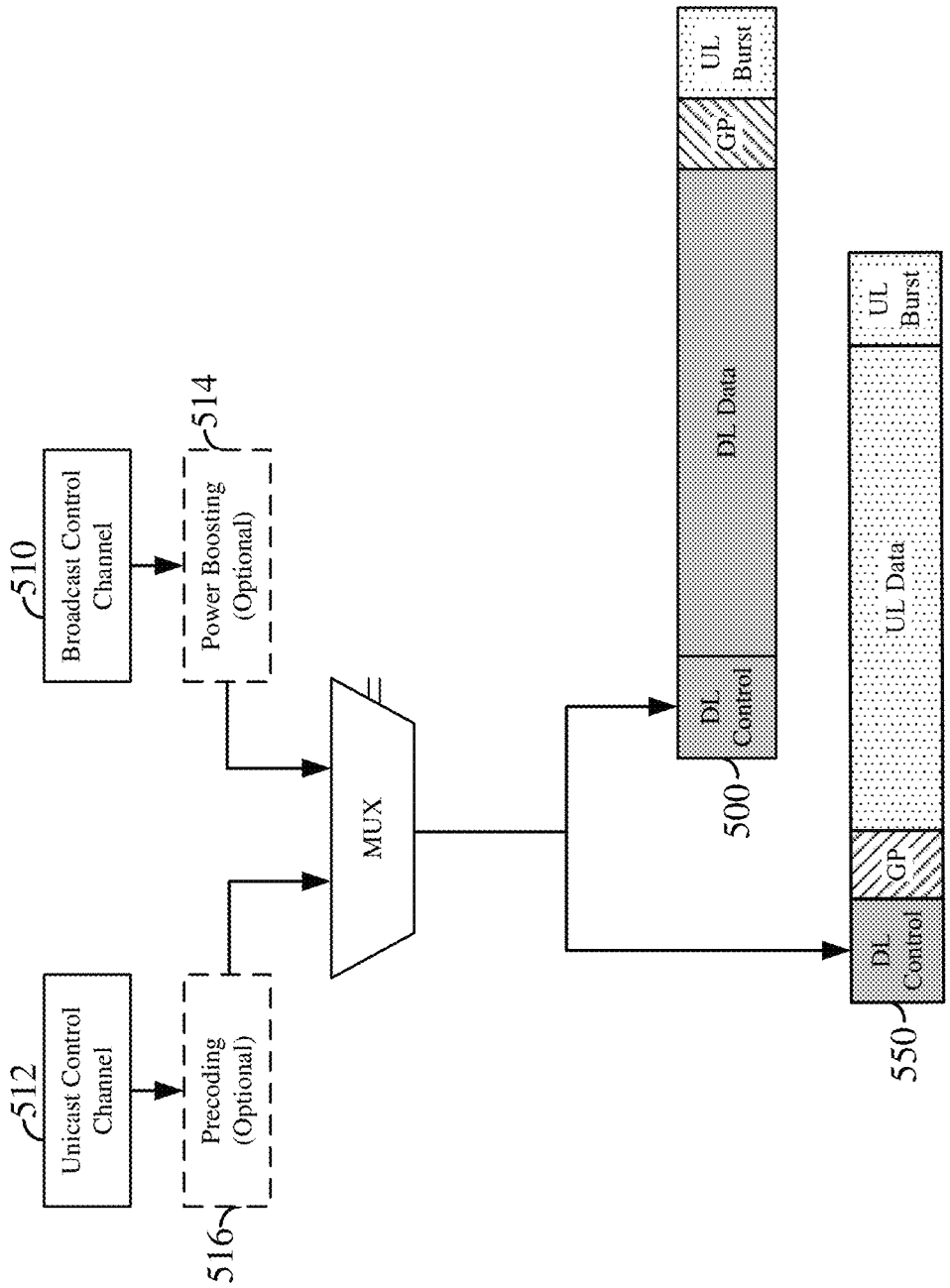
FIG. 5 is a block diagram illustrating the multiplexing of a broadcast control channel and a unicast control channel according to an example aspect of the disclosure.

According to certain aspects of the present disclosure, as illustrated in FIG. 5, the DL control region of a slot, such as the DL-centric slot 500 and UL-centric slot 550, may be configured as a broadcast control channel 510, a unicast control channel 512, or a multiplexed combination of the two. That is, in addition to the potential use of a PBCH for higher-layer information broadcasts (as discussed above), the PDCCH may be configured to support both broadcast and unicast downlink control channels for layer 1 and layer 2 control channel elements (e.g., a unicast PDCCH and a broadcast PDCCH). Here, a PDCCH may be mapped to one or more control channel elements (CCE), wherein a CCE generally includes an integer number of physical resource blocks (PRBs). By multiplexing together both a broadcast control channel and a unicast control channel, improved flexibility and reliability of control transmissions can be provided. Furthermore, parallel reception and processing of a broadcast control channel and a unicast control channel may reduce the latency and complexity at the receiving UE.

FIG. 5 schematically illustrates the multiplexing of a broadcast control channel 510 (broadcast PDCCH) and a unicast control channel 512 (unicast PDCCH) according to one example. The multiplexing can be conducted, for example, in frequency domain (FDM), time domain (TDM), or space domain (SDM). In various examples, the DL control region of any given slot may include a unicast control channel, a broadcast control channel, or a combination of the two. As seen in this illustration, the multiplexed channels may be carried in the first symbol or symbols (e.g., in a DL control region) of a DL-centric slot 500 and/or an UL-centric slot 550. For simplicity, the DL-centric slot 500 and UL-centric slot 550 are the same as those slots described above and illustrated in FIG. 4. However, those of ordinary skill in the art will recognize that these slot structures are merely exemplary in nature, and any suitable slot structure may be utilized within the scope of this disclosure.

As seen in FIG. 5, a broadcast control channel 510 is provided. The broadcast control channel 510 (e.g., broadcast PDCCH) may be mapped to a common search space to be monitored by all UEs served by a given base station. In various aspects of this disclosure, a base station may dynamically and opportunistically configure the common search space on the shared spectrum that carries the broadcast control channel 510. This search space is described further below. Further, the broadcast control channel 510 may optionally be subjected to a power boost 514. That is, the power of the broadcast control channel 510 may be boosted before being combined or multiplexed with the unicast control channel 512. Because the broadcast control channel 510 provides control information to all UEs in a cell, in general, the broadcast control channel 510 may not adopt UE-specific precoding or beamforming.

Further, a unicast control channel 512 is provided. The unicast control channel 512 may generally be directed to a specific UE, and accordingly, may optionally utilize UE-specific precoding/beamforming 516 to direct the signal to a corresponding UE. That is, the unicast control channel 512 may be configured for MIMO or beamforming before being combined or multiplexed with the broadcast control channel 510.

Payload

In a further aspect of this disclosure, the broadcast control channel 510 may generally be configured to carry common control information relating to access control for the shared spectrum. Due to the important nature of this information, the payload of the broadcast control channel 510 may be configured for high delivery reliability relative to that of the unicast control channel 512. For example, the broadcast control channel may be configured to carry a very compact payload. Furthermore, the modulation and coding scheme (MCS) of the broadcast control channel may be configured more robustly than that of the unicast control channel, so that the common control information can reliably reach even users at a cell boundary, who may suffer from a large path loss and inter-cell interference. That is, at the bit level and/or at the block level, the MCS used for transmission of the broadcast control channel may be configured for high reliability, or low error rates.

In one example, the broadcast control channel may carry time-critical physical layer control information for all UEs. For example, such information may relate to medium sensing of the shared spectrum, medium reservation information, a wake-up signal, and/or the medium sharing status. Other control information with less need for high reliability (e.g., non-critical control information) may in some examples be sent on a unicast control channel.

In a further aspect of this disclosure, in a PRB where a broadcast control channel is transmitted, CCEs corresponding to the broadcast control channel may occupy the first symbol(s) of a UL-centric or DL-centric slot. In this manner, by front-loading the slot with broadcast control channel information, any important or time-critical information in that slot (e.g., information needed to process traffic within that slot) may be received and processed more quickly.

FIG. 6 is a schematic illustration of one example showing possible information elements (IEs) that may be carried by a broadcast control channel according on an aspect of the present disclosure. This example generally illustrates concepts of a compact payload in the broadcast control channel, which can improve reliability of the information and reduce latency when compared to control channels with large payloads. However, it is to be understood that a broadcast control channel within the scope of the present disclosure may include additional information and/or may omit one or more of the IEs illustrated in FIG. 6 and described herein. Moreover, the order of the information included in a broadcast control channel may vary from the exemplary order described below.

In this example, a duplexing mode IE 602 may include one bit indicating what form of duplexing is utilized on the shared spectrum for that slot, e.g., TDD or FDD. A link direction IE 604 may include information about the direction for communication for one or more slots on the shared spectrum carrier. For example, if the duplexing mode is TDD, the link direction information 604 may include one bit indicating whether the slot is a DL-centric slot or an UL-centric slot. In other examples, the link direction information 604 may include one or more bits indicating a DL/UL slot pattern used on the carrier. An almost blank slot indicator IE 606 may include one bit indicating whether the slot is blank or nearly blank, which may be useful for interference management algorithms. In some examples the almost blank slot indicator IE 606 may be generated by virtue of medium sensing of the shared spectrum, either performed by the scheduling entity, or signaled to the scheduling entity by another node sensing the shared spectrum. A numerology of DL control region IE 608 may include, for example, one bit configured to indicate the numerology of the shared spectrum carrier, or at least a portion of the carrier (e.g., for a slot, for the DL control region of a slot, etc.).

A medium reservation IE 610 may carry information relating to reservation of the medium, such as reservation handshakes including requests and responses, reservation priority information, etc. According to an aspect of this disclosure, the reservation may reserve resources on a shared spectrum or unlicensed band. In another example, the medium reservation information IE 610 may refer to a carrier that multiplexes ultra-reliable low-latency communication (URLLC) and enhanced mobile broadband (eMBB) waveforms. That is, in RATs that utilizing licensed or shared spectrum for general communication, a separate component carrier may be utilized for URLLC, for eMBB, or for any other suitable purpose. In such example, the medium reservation information IE 610 may be utilized for reservation of that separate component carrier.

In various examples, the medium reservation IE 610 may include a reservation signal request (RRQ), a reservation response signal (RRS), and/or information about the priority of this reservation (e.g., a priority class). In some examples, the medium reservation IE 610 may include mini-slot configuration information (e.g., corresponding to URLLC transmissions and/or mmWave communications). In still further examples, the medium reservation information 610 may include a wake-up signal. When a receiving device in the cell receives such a wake-up signal, that UE may move from an idle or discontinuous reception (DRX) mode to a connected mode. In the connected mode, the receiving device may undertake any one or more various tasks, including but not limited to sensing or monitoring the shared spectrum carrier, re-establishing synchronization, beginning a channel access procedure (e.g., LBT) to gain access to the shared spectrum, etc. The length of the medium reservation information IE 610 may vary in some examples, and may be configurable.

A minimum system information block (M-SIB) IE 612 may include a grant for the M-SIB system information. Here, the M-SIB may refer to a master information block (MIB) and/or one or a plurality of system information blocks (SIBs). Depending on the size of the M-SIB, in some examples, the M-SIB IE 612 may alternatively carry the full or partial message of the M-SIB itself, rather than a grant for access of this information elsewhere in the slot. In still another example, the M-SIB IE 612 may be configurable, either carrying a grant for the M-SIB, or the M-SIB information itself. The length of the M-SIB IE 612 may vary in some examples, and may be configurable.

A cyclic redundancy check (CRC) IE 614 may include one CRC bit in the broadcast control channel payload, providing an integrity check for the payload. The CRC can also be extended to multiple bits and configured as a function of one or more cell-specific parameters, such as the cell ID.

Resource Allocation for Broadcast Control Channel

As discussed above, a scheduling entity may allocate resources in a common search space for carrying control channel elements (CCEs) corresponding to a broadcast control channel. All UEs served by the scheduling entity may monitor or search the common search space, in common. According to certain aspects of the present disclosure, a scheduling entity may allocate resources for carrying the broadcast control channel across the carrier either utilizing a distributed search space, or a localized search space.

Figure 7:
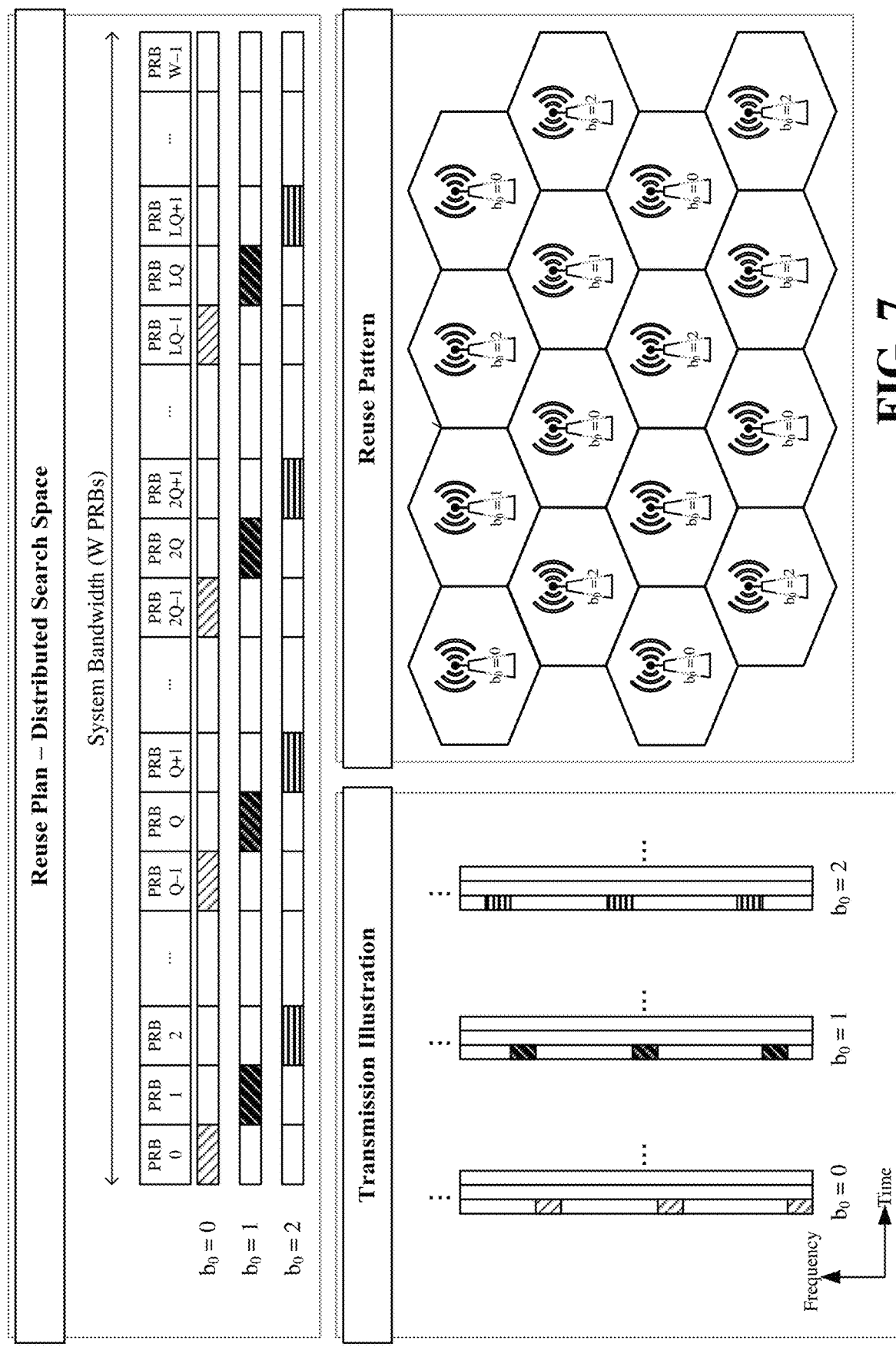
FIG. 7 is a schematic illustration of a distributed search space for a broadcast control channel according to an example aspect of the disclosure.

FIG. 7 is a schematic illustration showing three views of an exemplary distributed search space for a broadcast control channel according to an aspect of this disclosure. In the illustration, a system bandwidth for a UL or DL carrier is shown with the horizontal direction representing frequency. This frequency dimension is illustrated as being divided into a series of W physical resource blocks (PRBs), labeled $PRB_0$-$PRB_{W-1}$.

As shown in the exemplary illustrated reuse plan, the search space in which a UE may search for the broadcast control channel within each of three different cells is illustrated in three rows. In this schematic illustration, three cells are illustrated, although this scheme may apply to any suitable number of cells. As described further below, a row does not necessarily represent any single particular cell, but rather, it illustrates a reuse pattern for any number of cells. For example, with three rows illustrated in the reuse plan in FIG. 7, a reuse factor is r=3. In a given implementation using a reuse pattern according to such a reuse plan, the same PRBs may be used for transmission of the broadcast control channel in cells that are geographically located at a distance from one another, or otherwise configured such that their interference with one another may be reduced or minimized. To ensure the ability to configure a wireless network where reuse of a broadcast control channel allocation does not cause too great of inter-cell interference with nearby cells, in various implementations a RAN may be configured such that r≥3.

In the reuse plan illustrated in FIG. 7, PRBs where a broadcast control channel is transmitted in a given cell are illustrated with a hatch pattern. Other PRBs where a broadcast control channel is not transmitted are illustrated in a solid or unshaded pattern. In some examples, the PRBs that do not carry a broadcast control channel may carry a unicast control channel. As seen in FIG. 7, in both the illustrated reuse plan and the transmission illustration, by utilizing this resource allocation, a transmission of the broadcast control channel in one cell is allocated such that it does not overlap with a transmission of the broadcast control channel in any other cell within the reuse set. In this way, when combined with a suitable location and placement of cells in a reuse pattern, inter-cell interference from cells utilizing a broadcast control channel may be reduced, improving the reliability of these broadcast control channel transmissions.

The resource allocation for the broadcast control channel may be distributed across the system bandwidth, spanning multiple PRBs distributed across the system bandwidth of the shared spectrum carrier. Here, the respective PRBs allocated for carrying the broadcast control channel may be distributed in the frequency domain. In this manner, the broadcast control channel may benefit from frequency diversity gain. However, if or when coherent demodulation of the broadcast control channel is desired, larger overhead corresponding to the inclusion of reference signals (e.g., control reference signals or CRS) may be needed. According to some aspects of this disclosure, discussed further below, transmission of the broadcast control channel may utilize a modulation scheme configured such that a CRS is not needed. Accordingly, a CRS may be omitted from those PRBs that carry the broadcast control channel.

According to this example, the search space or resource allocation for the broadcast control channel may be cell-specific and semi-static. That is, the set of PRBs allocated for carrying the broadcast control channel for a given cell may be a function of one or more cell-specific parameters, such as a cell ID, the system bandwidth for that cell, and a subframe number. However, the search space need not depend solely on such cell-specific parameters, and may additionally or alternatively depend on one or more parameters that are not specific to any particular cell, such as a reuse factor (discussed further below). Because these parameters may change relatively infrequently, the search space within a given cell may remain semi-static.

For example, in the reuse plan shown in FIG. 7, L may represent the number of PRBs allocated for carrying the broadcast control channel in a given cell, e.g., a cell having cell ID x. L may be a configurable parameter that may depend on the payload size and coverage requirement for the broadcast control channel.

In this example, the L PRBs allocated for cell ID x may be given by $b_0 + lQ$, where $l = 0, 1, \ldots, (L-1)$. Here, $b_0 \triangleq y + \mathrm{mod}(x, r)$ (the second term is also written as x mod r) represents an index for the starting location of the PRB allocation. That is, the cell ID x may be subjected to a modulo operation as a function of a reuse factor r. y denotes a frequency hopping offset, which may be a function of one or more parameters, including but not limited to the subframe number and system bandwidth. Further, Q may represent a step size for spacing the L PRBs across the system bandwidth. In an illustrative example, the step size $Q \triangleq \lfloor (W-r)/(L-1) \rfloor$ for a system bandwidth of W PRBs.

As one nonlimiting example, when a system bandwidth is given as 80 MHz and subcarrier spacing is 30 kHz, a selection of values r=6, L=8, and Q=16 may provide a suitable distributed resource allocation for the broadcast control channel.

With this resource allocation, a UE in a given cell may be enabled to reduce its search space for searching for the broadcast control channel. That is, rather than searching across the entire system bandwidth to locate the PRBs that carry a broadcast control channel, each UE within a given cell may utilize these same parameters to determine in which PRBs focus its search. Accordingly, the UE may easily obtain the broadcast control channel information without multiple attempts of blind decoding.

Figure 8:
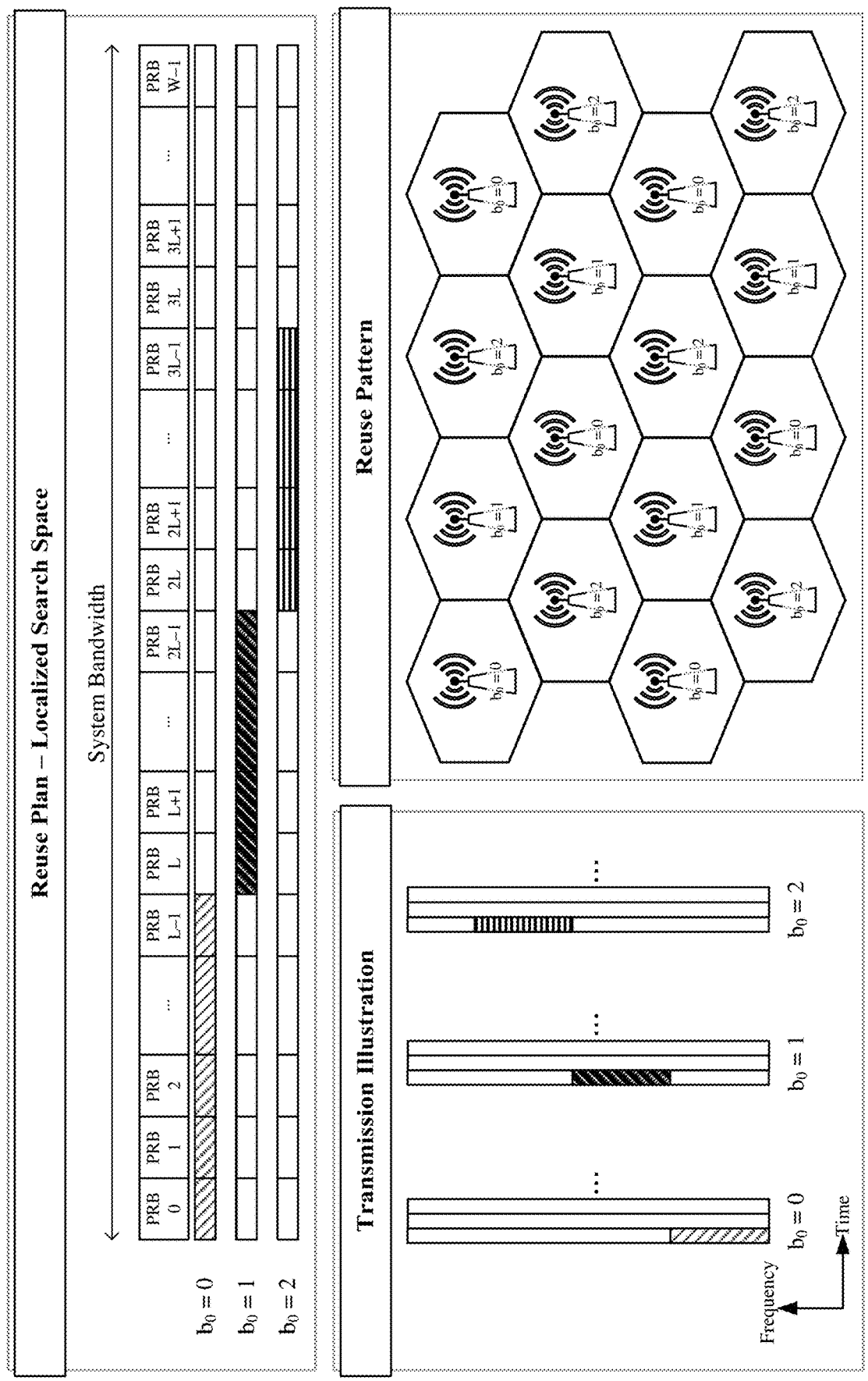
FIG. 8 is a schematic illustration of a localized search space for a broadcast control channel according to an example aspect of the disclosure.

FIG. 8 is a schematic illustration showing three views of an exemplary localized search space for a broadcast control channel according to a further aspect of this disclosure. As in the previous example described above and illustrated in FIG. 7, and as seen in the transmission illustration in FIG. 8, CCEs corresponding to a broadcast control channel may occupy the first symbol(s) of a UL-centric or DL-centric slot. However, unlike the previous example, where the CCEs were distributed across the system bandwidth, here, the CCEs for a broadcast control channel may be localized, spanning a set of multiple PRBs that may be contiguous with one another, in the frequency domain, and spanning only a portion of the system bandwidth of the shared spectrum carrier.

As with the previous example, inter-cell interference may be mitigated among cells within a reuse set. Furthermore, relative to the use of a distributed search space, by utilizing a localized search space, the overhead needed to enable channel estimation (e.g., including reference signals that occupy some resource elements) may be reduced. That is, because the CCEs are in a contiguous block, channel estimation for the entire system bandwidth may be omitted, and a channel estimate for the block carrying the broadcast control channel may suffice for demodulation of the broadcast control channel. For example, as discussed further below, differential modulation may be implemented in some examples for modulating the broadcast control channel transmission. Differential modulation looks at the phase difference between symbols to recover the information, without needing a separate reference signal, and resulting in reduced overhead.

However, relative to the previous example in FIG. 7 utilizing a distributed resource allocation, this example with a localized resource allocation utilizes less of the full system bandwidth. Accordingly, a localized resource allocation for the broadcast control channel may result in reduced frequency diversity gain compared to that for a distributed resource allocation.

In a further example aspect of the disclosure, for the localized search space described here and illustrated in FIG. 8, the search space (resource allocation) for the broadcast control channel may be cell-specific and semi-static, being a function of the cell ID, system bandwidth, and subframe number. In the illustrated example, a given cell may utilize a contiguous set of L PRBs in a row to carry a broadcast control channel. For example, the L PRBs allocated for cell ID x can be given by $b_0 L + l$, $l = 0, 1, \ldots, (L-1)$, where $b_0 \triangleq y + \mathrm{mod}(x, r)$ is the PRB starting location; integer $r \geq 3$ is a reuse factor; and L is a configurable parameter that may depend on the payload size and/or coverage requirement for the broadcast control channel. Here, the parameter L may be upper bounded by $L < \lfloor W/r \rfloor$ for a system bandwidth of W PRBs. Further, y denotes a frequency hopping offset, which may be a function of subframe number and system bandwidth.

That is, in some examples, utilizing either the distributed resource allocation or the localized resource allocation, the starting PRB (e.g., PRB 0) may additionally or alternatively include a frequency hopping offset that depends on the subframe number and system bandwidth. This can enhance the frequency diversity in a slow fading system (time non-selective) and a wideband system (frequency selective). However, when the system bandwidth is small, or the fading is slow, the gain of frequency hopping may diminish, and the value of y may be set to 0.

Modulation and Coding Scheme

Figure 9:
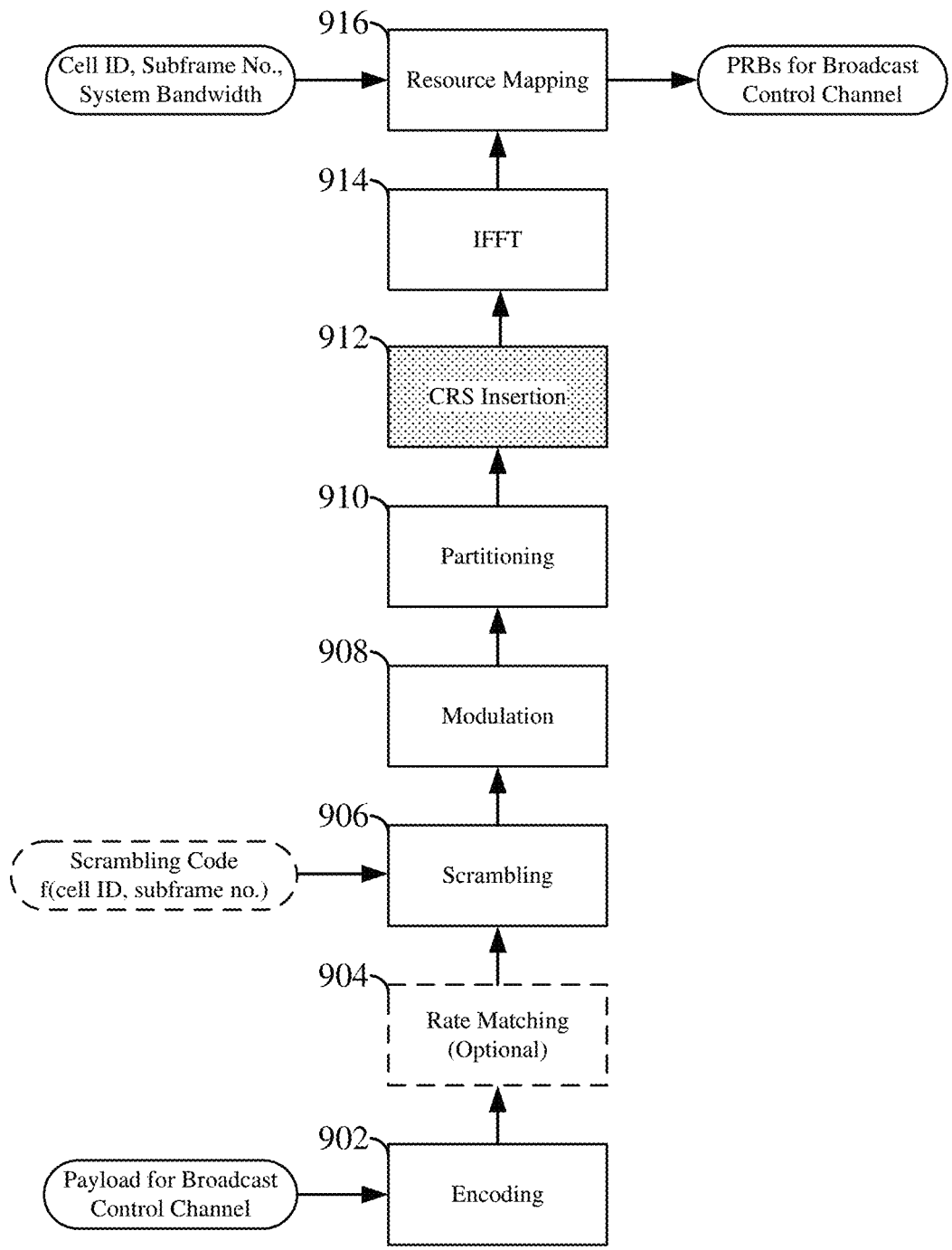
FIG. 9 is a schematic block diagram illustrating a portion of a transmitter for coherent modulation and coding of a broadcast control channel according to an example aspect of the disclosure.
Figure 10:
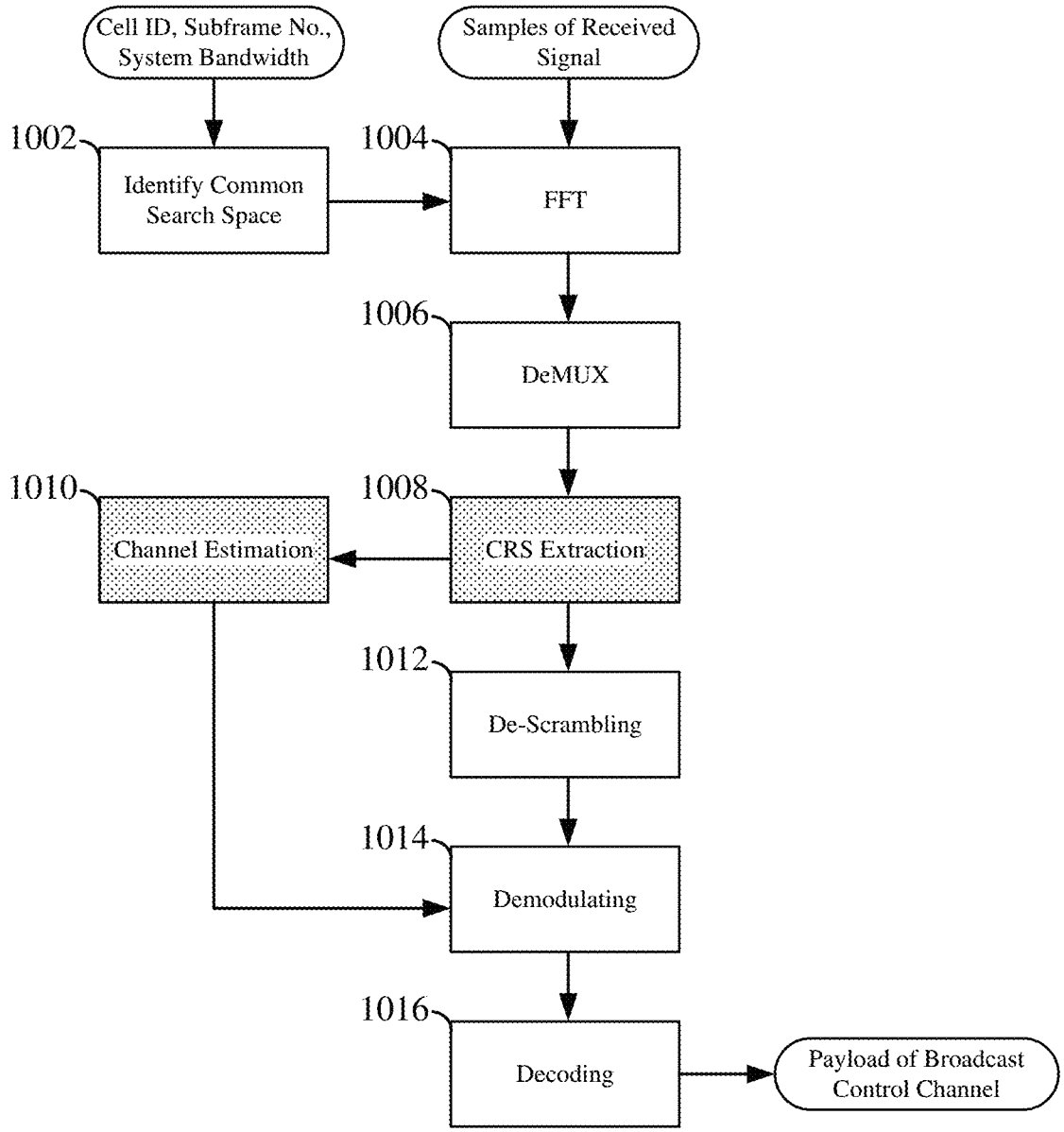
FIG. 10 is a schematic block diagram illustrating a portion of a receiver for coherent demodulation and decoding of a broadcast control channel according to an example aspect of the disclosure.
Figure 11:
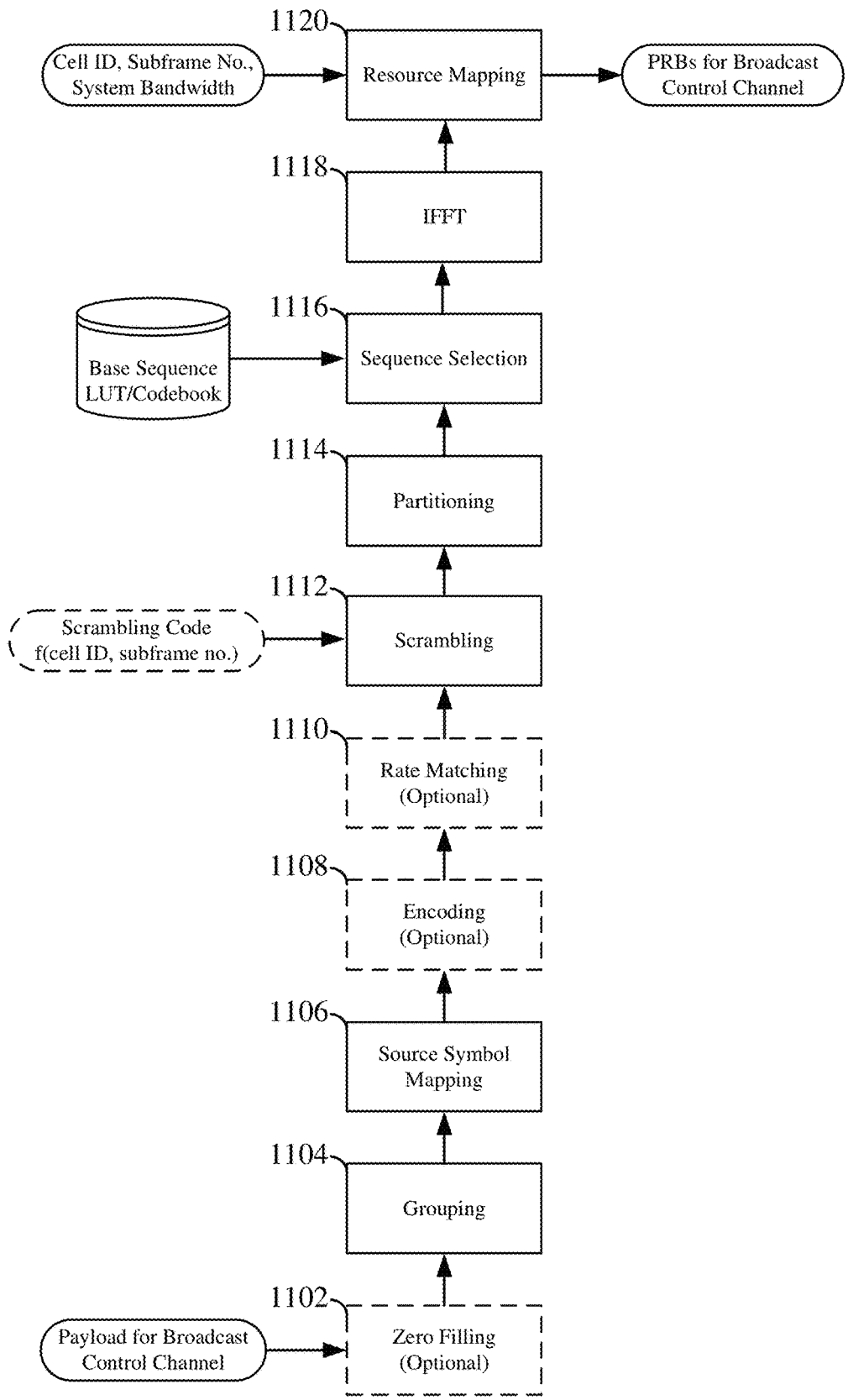
FIG. 11 is a schematic block diagram illustrating a portion of a transmitter for sequence-based modulation and coding of a broadcast control channel according to an example aspect of the disclosure.
Figure 12:
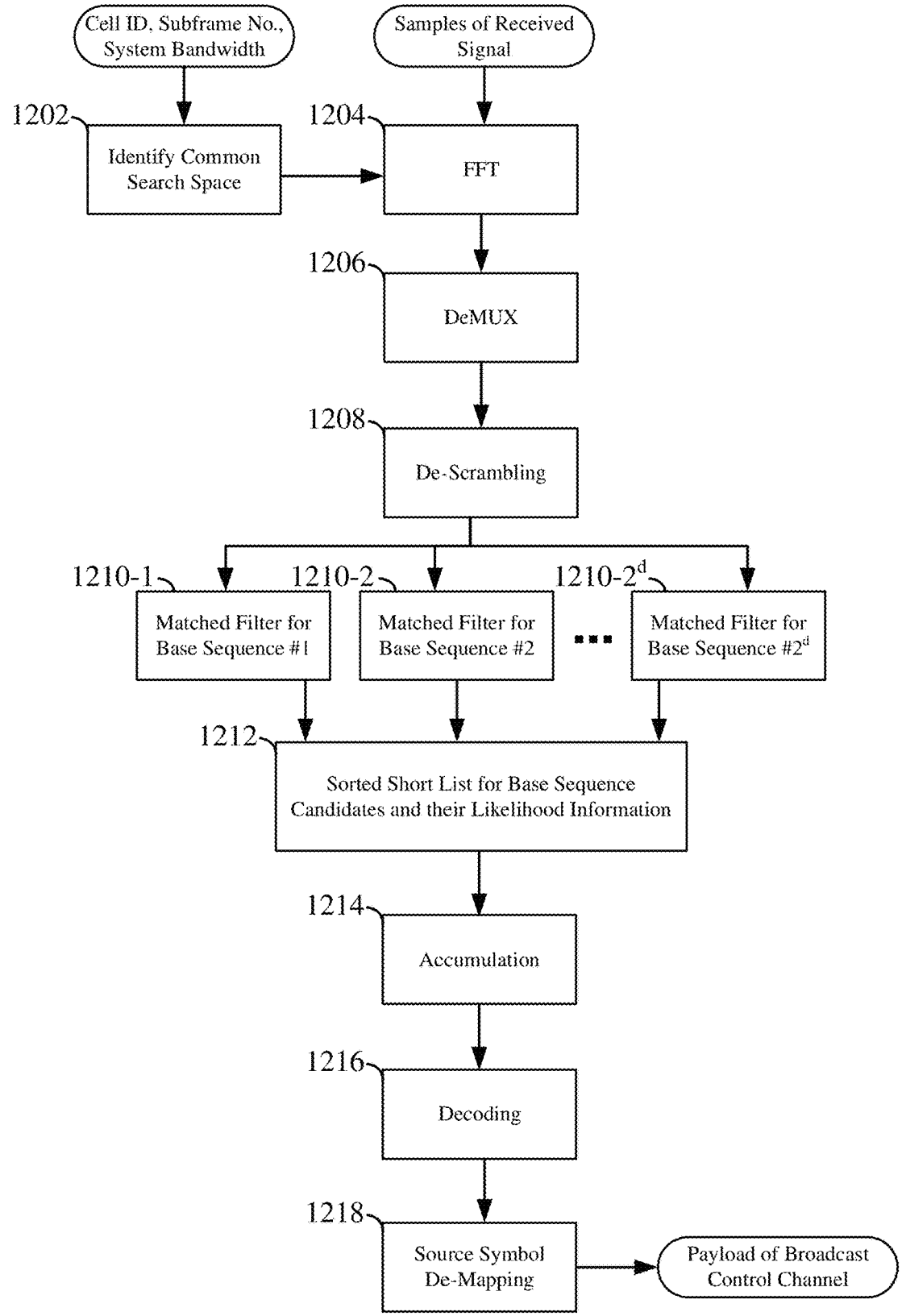
FIG. 12 is a schematic block diagram illustrating a portion of a receiver for sequence-based demodulation and decoding of a broadcast control channel according to an example aspect of the disclosure.
Figure 13:
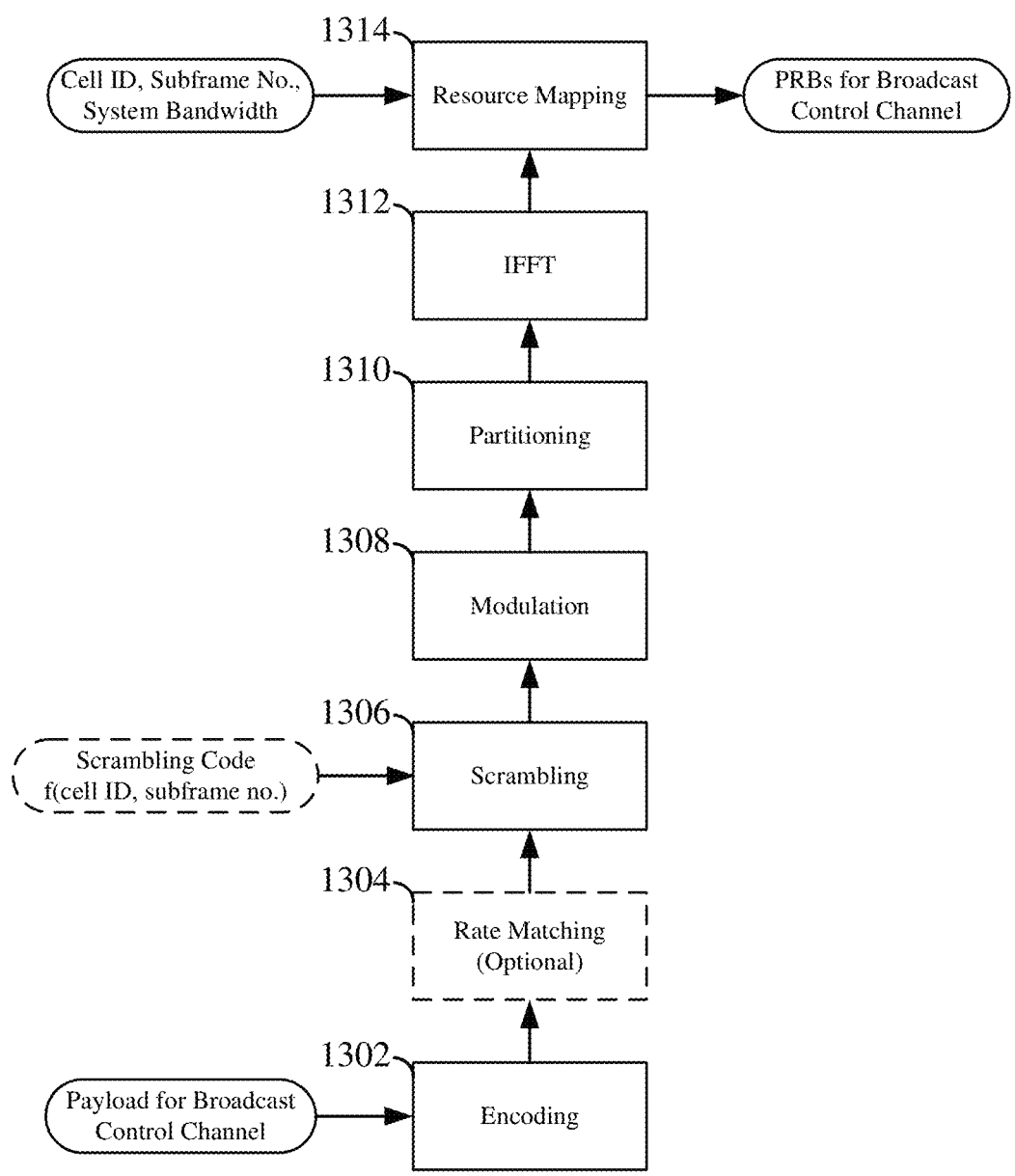
FIG. 13 is a schematic block diagram illustrating a portion of a transmitter for differential modulation and coding of a broadcast control channel according to an example aspect of the disclosure.
Figure 14:
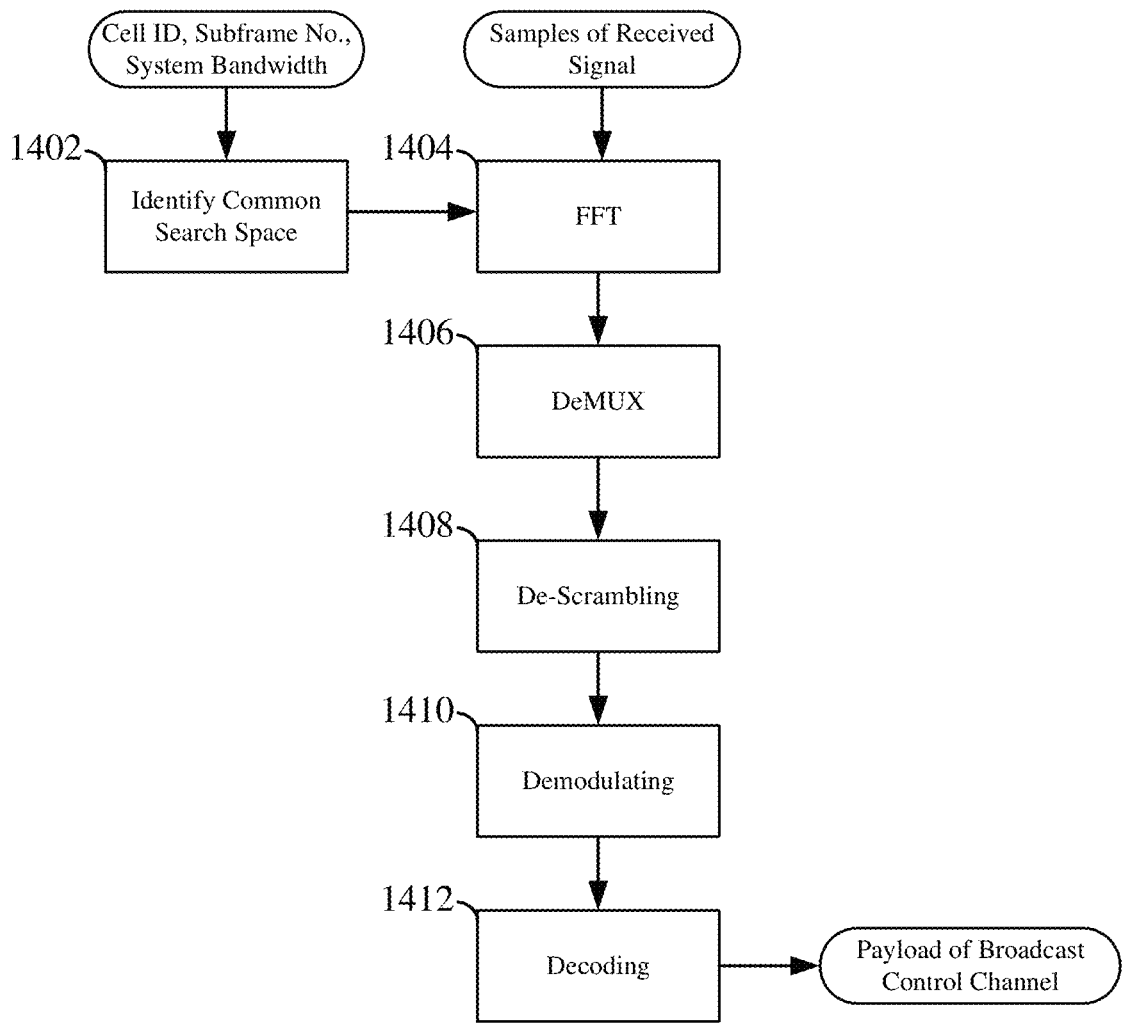
FIG. 14 is a schematic block diagram illustrating a portion of a receiver for differential demodulation and decoding of a broadcast control channel according to an example aspect of the disclosure.

As discussed above, a scheduling entity may configure the modulation and coding scheme (MCS) used for transmission of a broadcast control channel to be highly robust, to provide for high reliability of data reception at the receiving UEs. According to various aspects of the present disclosure, different options and algorithms are disclosed for the MCS. In particular, FIGS. 9-10 illustrate transmission and reception, respectively, of a broadcast control channel utilizing coherent modulation together with bit level error correction coding. FIGS. 11-12 illustrate transmission and reception, respectively, of a broadcast control channel utilizing sequence-based mapping, combined with error correction coding at the PRB level. Finally, FIGS. 13-14 illustrate transmission and reception, respectively, of a broadcast control channel utilizing differential modulation combined with bit level error correction coding.

FIG. 9 is a schematic block diagram illustrating a portion of a transmit chain that may be utilized at a scheduling entity for generating and transmitting a broadcast control channel according to another aspect of the present disclosure. In some examples, each block may correspond to separate hardware components of the transmit chain. In other examples, any combination of the illustrated blocks up to and including all of the illustrated blocks, may be combined into a single hardware component. The separate blocks are intended to represent functional blocks to aid in the description of the generation and transmission of the broadcast control channel.

As shown in FIG. 9, the transmitting device (e.g., scheduling entity) may collect (e.g., from a memory or buffer) the information or payload bits corresponding to an M-bit payload for transmission over the broadcast control channel. For example, the payload may correspond to the exemplary broadcast control channel payload illustrated in FIG. 6; however, any suitable payload may be utilized.

The transmitting device (e.g., scheduling entity) may then pass the M payload bits to a binary FEC encoder 902 with a code rate of M/N. The encoder 902 may utilize any suitable channel code, including but not limited to polar codes, LDPC codes, Reed Muller codes, convolutional codes, etc. The use of such channel coding introduces redundancy into the payload at the bit level, such that recovery of the payload by the receiver generally involves recovery of each received bit, individually. This differs from the example described below that utilizes a sequence-based modulation, wherein the coding is added at the PRB level.

In the illustration of FIG. 9, a rate matching block 904 is shown after the FEC encoder 902. Rate matching may enable other code rates, if desired, other than the code rate M/N, e.g., by way of repetition and/or puncturing. However, in some examples, the rate matching function may be carried out by the encoder 902.

At scrambling block 906, the N encoded bits (or other number of encoded bits if rate matching is used) may then be subjected to scrambling. In some examples, a scrambling code can be generated with a polynomial initialized by one or more cell-specific parameters, such as the cell ID and/or the subframe number. However, any suitable scrambling code may be utilized within the scope of this disclosure.

After scrambling, a modulation block 908 may apply coherent modulation to the N encoded bits (e.g. quadrature phase-shift keying (QPSK)). QPSK is one suitable example, utilized for PDCCH transmissions in LTE. Following modulation, a partitioning block 910 may partition, group, or divide (e.g., uniformly partition) the modulated set of bits into subsets. QPSK is a coherent modulation: in order to recover the modulated symbols, coherent demodulation including channel estimation is used. Accordingly, a CRS insertion block 912 may insert a control reference signal (CRS) for channel estimation and coherent demodulation. Thus, the modulated control symbols may be multiplexed with the CRS. As discussed above, the inclusion of the CRS in the broadcast control channel transmission has the effect of undesirably increasing overhead. Accordingly, other MCS's are described below that enable the omission of such a CRS insertion block 912.

After applying an inverse FFT 914, a resource mapping block 916 may map the multiplexed symbols and CRS's to the L PRBs allocated for the broadcast control channel. For example, these L PRBs may be determined according to a distributed or localized resource allocation, as described above. In some examples, the scheduling entity may additionally use TX diversity schemes such as space frequency block coding (SFBC) and/or cyclic delay diversity (CDD) for the broadcast.

FIG. 10 is a schematic block diagram illustrating a portion of a receive chain that may be utilized at a scheduled entity for receiving and decoding a broadcast control channel according to an aspect of the present disclosure. In some examples, each block may correspond to separate hardware components of the receive chain. In other examples, any combination of the illustrated blocks up to and including all of the illustrated blocks, may be combined into a single hardware component. The separate blocks are intended to represent functional blocks to aid in the description of the reception and processing of the broadcast control channel.

As shown in FIG. 10, the receiving device (e.g., scheduled entity) may identify the common search space 1002, in which to search for a broadcast control channel. As discussed above, the common search space may be a distributed search space or a localized search space, including a set of PRBs identified according to a function of one or more parameters, e.g., cell-specific parameters such as the cell ID for a scheduling entity, the subframe or slot number, and/or the system bandwidth for the downlink carrier. In some examples, the scheduled entity may retrieve these parameters from a PBCH transmission, which may carry a MIB with system parameters. In other examples, the scheduled entity may obtain the respective parameters from any suitable source.

After receiving and sampling the waveforms carried in the common search space, the samples may be subjected to an FFT 1004. A demultiplexer 1006 may then separate the multiplexed information signals and CRS's. A CRS extraction block 1008 may then feed the CRS's to a channel estimation block 1010 for the generation of an estimate of the channel or carrier carrying the broadcast control channel. With the CRS's extracted from the information signals, the information signals may then be de-scrambled 1012, and a demodulation block 1014 may then perform coherent demodulation of the information signals. Here, for coherent demodulation, the scheduled entity may utilize the channel estimate based on the CRS. The scheduled entity may then send demodulated information bits to a decoding block 1016, which may perform bit-level decoding to recover the payload of the broadcast control channel.

FIG. 11 is a schematic block diagram illustrating a portion of a transmit chain that may be utilized at a scheduling entity for generating and transmitting a broadcast control channel according to an aspect of the present disclosure. In some examples, each block may correspond to separate hardware components of the transmit chain. In other examples, any combination of the illustrated blocks up to and including all of the illustrated blocks, may be combined into a single hardware component. The separate blocks are intended to represent functional blocks to aid in the description of the generation and transmission of the broadcast control channel.

As shown in FIG. 11, a transmitting device (e.g., scheduling entity) may collect (e.g., from a memory or buffer) the information or payload bits corresponding to an M-bit payload for transmission over the broadcast control channel. For example, the payload may correspond to the exemplary broadcast control channel payload illustrated in FIG. 6; however, any suitable payload may be utilized.

At grouping block 1104, the M payload bits may be evenly partitioned, grouped, or divided into K groups. However, depending on the length of the payload, M may not be divisible by K. Accordingly, in some examples, the scheduling entity may employ zero filling 1102, and may fill a suitable number of bits into the payload bits. In this way, for the K groups may each include the same number of bits. As a result of the grouping, the payload bits are carried within K groups of bits, wherein each group has $d \triangleq \lceil M/K \rceil$ bits. Here, if zero filling is employed, one or more of the groups may include the zero-filled bits.

A source symbol mapping block 1106 may then map the K groups of d payload bits into K source symbols. Accordingly, each symbol represents a corresponding set of d bits. These K symbols may be binary or nonbinary. That is, the source symbol mapping may be defined according to any suitable alphabet of cardinality $2^d$.

After mapping, the scheduling entity may then pass the K source symbols to a forward error correction (FEC) encoder 1108. With a code rate of K/L, the encoder 1008 outputs L symbols. Accordingly, certain parity symbols may be added to the K symbols to introduce redundancy into the broadcast. Any suitable FEC may be utilized, including but not limited to polar codes, LDPC codes, Reed Solomon codes, convolutional codes, etc.

In some examples, such channel coding may be optional, and may be omitted. That is, because the sequence selection block 1116 may select the bit sequence for given sets of bits, it may not be necessary for such bit-level redundancy to be applied to those sets of bits.

In the illustration of FIG. 11, a rate matching block 1110 is shown after the FEC encoder 1108. Rate matching may enable other code rates, if desired, other than the code rate K/L, e.g., by way of repetition and/or puncturing. However, in some examples, the rate matching function may be carried out by the encoder 1108. Further some examples may omit a rate matching function.

In some examples, the L output symbols of the FEC encoder 1108 may be expanded into a set of bits of length Ld. The scheduling entity may then scramble 1112 the Ld bits. In some examples, a scrambling code can be generated with a polynomial initialized by the cell ID and the subframe number.

After scrambling, a partitioning block 1114 may partition, group, or divide (e.g., uniformly partition) the scrambled bits into L subsets. Here, each of the L subsets may include d bits.

Next, a sequence selection block 1116 may map each of the L subsets to a corresponding base sequence, or a concatenation of base sequences, by utilizing a suitable look-up table (LUT) or codebook including the set of base sequences. Here, a base sequence may correspond to a group of symbols in the time domain or frequency domain, which may map to a carrier or PRB. According to an aspect of the present disclosure, base sequences that have good auto- and cross-correlation properties (e.g. constant amplitude zero autocorrelation waveforms (CAZAC), Walsh codes, Low-density power boosted comb-like discrete tones, etc.) may be utilized in the LUT or codebook. Further, sequences that cause the broadcast control channel transmission to have a low peak-to-average power ratio (PAPR) and/or cubic metric (CM) may be desirable. By virtue of the use of such base sequences that have good correlation properties, the receiver function (described further below) may be simplified. That is, rather than requiring a receiver device to decode and recover each individual bit of the broadcast control channel, the receiver device (e.g., scheduled entity) may simply implement a matched filter or correlation receiver to detect the entire sequence or group of bits, which represents the information in the broadcast control channel. The receiver then can determine the sequence, and as a result, determine the slot index or the bits of the control information, without needing the full channel estimation and demodulation process. The good correlation property of the base sequences, as well as the coding redundancy, provide robustness to combat channel fading, interference and noise. This reduces the complexity at the receiver at the same time as reducing overhead relating to CRS transmissions. That is, when sequence selection is used to modulate the broadcast control channel, the channel can omit reference signals (e.g., DMRS, CRS) in the common search space. In this way, sequence-based modulation can result in reduced overhead relative to QPSK or other coherent modulation techniques (e.g., see FIG. 9-10).

Within the LUT, to support all possible values for the d-bit subsets (where d is the number of bits in each of the L subsets of bits output from the partitioning block 1114), a number $\geq 2^d$ candidate sequences may be stored. Each of the L subsets input to the sequence selection block 1116 may correspond to a particular symbol. That symbol can be used as an index to choose the base sequences. Thus, the sequence selection block 1116 may use each subset to choose a specific base sequence from the LUT.

Next, the scheduling entity may apply an inverse fast Fourier transform (IFFT) block 1118 to the modulated symbols, and finally, the scheduling entity may utilize a resource mapping block 1120 to map the L base sequences to the L PRBs allocated for the broadcast control channel (e.g., determined according to a distributed or localized resource allocation, as described above). In some examples, the resource mapping 1120 may implement transmit diversity (TXD), such as space frequency block coding (SFBC), small or large cyclic delay diversity (CDD), etc.

Note once again that in this example, a DMRS or a cell-specific reference signal (CRS) is not needed, since sequence-correlation may be used at the receiver. In this way, the need for channel estimation is foregone.

FIG. 12 is a schematic block diagram illustrating a portion of a receive chain that may be utilized at a scheduled entity for receiving and decoding a broadcast control channel according to an aspect of the present disclosure. In some examples, each block may correspond to separate hardware components of the receive chain. In other examples, any combination of the illustrated blocks up to and including all of the illustrated blocks, may be combined into a single hardware component. The separate blocks are intended to represent functional blocks to aid in the description of the reception and processing of the broadcast control channel.

As shown in FIG. 12, the receiving device (e.g., scheduled entity) may identify the common search space 1202, in which to search for a broadcast control channel. As discussed above, the common search space may be a distributed search space or a localized search space, including a set of PRBs identified according to a function of the cell ID for a scheduling entity, the subframe or slot number, and/or the system bandwidth for the downlink carrier. In some examples, the scheduled entity may retrieve these parameters from a PBCH transmission, which may carry a MIB with system parameters. In other examples, the scheduled entity may obtain the respective parameters from any suitable source.

After receiving and sampling the waveforms carried in the common search space, the samples may be subjected to an FFT 1204. A demultiplexer 1206 may then separate the multiplexed information signals from one another. The information signals may then be de-scrambled 1208, and then demodulated utilizing a plurality of matched filters 1210-n. Those of ordinary skill in the art will recognize that other examples may utilize correlation receivers in this place, without deviating from the scope of this disclosure. Here, each matched filter may correspond to one of the base sequences used for generation of the broadcast control channel. As illustrated in FIG. 12, corresponding to an example where there are $2^d$ possible base sequences, the scheduled entity may include $2^d$ matched filters. The outputs from the respective matched filters (e.g., likelihood information that the respective base sequence for that matched filter is the received base sequence) may be provided to a sorting block 1212. The sorting block 1212 may then create a sorted list of at least the most likely candidates of the received base sequence, based on the likelihood information. The sorted list may further include the likelihood information received from the respective matched filter, for each candidate base sequence in the list. An accumulation block 1214 may then accumulate the information from the sorted short list to gather together the respective subsets of encoded bits corresponding to the respective received base sequences. In some examples, concatenation of a set of the received base sequences may enable the received information to satisfy a coding constraint of the forward error correction code utilized on the common control information in the broadcast control channel. Such a coding constraint may correspond to, or may be monitored by, the decoding block 1216. These accumulated base sequences may then be sent to the decoding block 1216 for decoding, and then to a source symbol de-mapping block 1218 to recover the payload of the broadcast control corresponding to that set of base sequences.

In this manner, the receiving device (e.g., scheduled entity) may utilize matched filtering or cross-correlation for maximum likelihood (ML) detection of the base sequences, without needing to perform channel estimation or coherent demodulation of the channel. ML decoding may be implemented at the PRB level (rather than at the bit level, as performed for coherent demodulation), based on the accumulated output of the matched filtering across multiple PRBs within the common search space.

FIG. 13 is a schematic block diagram illustrating a portion of a transmit chain that may be utilized at a scheduling entity for generating and transmitting a broadcast control channel according to yet another aspect of the present disclosure. In some examples, each block may correspond to separate hardware components of the transmit chain. In other examples, any combination of the illustrated blocks up to and including all of the illustrated blocks, may be combined into a single hardware component. The separate blocks are intended to represent functional blocks to aid in the description of the generation and transmission of the broadcast control channel.

As shown in FIG. 13, a transmitting device (e.g., scheduling entity) may collect (e.g., from a memory or buffer) the information or payload bits corresponding to an M-bit payload for transmission over the broadcast control channel. For example, the payload may correspond to the exemplary broadcast control channel payload illustrated in FIG. 6; however, any suitable payload may be utilized.

The transmitting device (e.g., scheduling entity) may then pass the M payload bits to a binary FEC encoder 1302 with a code rate of M/N. The encoder 1302 may utilize any suitable channel code, including but not limited to polar codes, LDPC codes, Reed Muller codes, convolutional codes, etc.

In the illustration of FIG. 13, a rate matching block is shown after the FEC encoder 1302. Rate matching may enable other code rates, if desired, other than the code rate M/N, e.g., by way of repetition and/or puncturing. However, in some examples, rate matching function may be carried out by the encoder 1302.

At scrambling block 1306, the N encoded bits (or other number of encoded bits if rate matching is used) may then be subjected to scrambling. In some examples, a scrambling code can be generated with a polynomial initialized by the cell ID and the subframe number. However, any suitable scrambling code may be utilized within the scope of this disclosure.

After scrambling, a modulation block 1308 may apply differential modulation to the N coded bits (e.g. differential quadrature phase shift keying, or D-QPSK). Note that this modulation differs from the example described above and illustrated in FIG. 9, which utilizes coherent modulation. With differential modulation, the information is carried based on the phase difference between symbols. In this example, by utilizing differential modulation, the symbols may be demodulated at the receiving device without need for a cell-specific reference signal (CRS) for channel estimation. This can reduce overhead relating to the CRS, enabling a higher throughput; or in another example, can enable a lower code rate with stronger error correction capability, improving reliability of the transmission. Furthermore, channel estimation may not be necessary at the receiving device, reducing the complexity of the receiving device.

Following modulation, a partitioning block 1310 may partition, group, or divide (e.g., uniformly partition) the scrambled bit sequence into subsets. After applying an inverse FFT 1312, a resource mapping block 1314 may map the differentially modulated symbols to the L PRBs allocated for the broadcast control channel. For example, these L PRBs may be determined according to a distributed or localized resource allocation, as described above.

Once again, with differential modulation there is no need for a DMRS or a CRS when contiguous PRBs are allocated, which saves the signaling overhead for medium sharing. In some examples, the scheduling entity may additionally use TX diversity schemes such as SFBC and/or CDD for the broadcast to extend the coverage.

FIG. 14 is a schematic block diagram illustrating a portion of a receive chain that may be utilized at a scheduled entity for receiving and decoding a broadcast control channel according to an aspect of the present disclosure. In some examples, each block may correspond to separate hardware components of the receive chain. In other examples, any combination of the illustrated blocks up to and including all of the illustrated blocks, may be combined into a single hardware component. The separate blocks are intended to represent functional blocks to aid in the description of the reception and processing of the broadcast control channel.

As shown in FIG. 14, the receiving device (e.g., scheduled entity) may identify the common search space 1402, in which to search for a broadcast control channel. As discussed above, the common search space may be a distributed search space or a localized search space, including a set of PRBs identified according to a function of the cell ID for a scheduling entity, the subframe or slot number, and/or the system bandwidth for the downlink carrier. In some examples, the scheduled entity may retrieve these parameters from a PBCH transmission, which may carry a MIB with system parameters. In other examples, the scheduled entity may obtain the respective parameters from any suitable source.

After receiving and sampling the waveforms carried in the common search space, the samples may be subjected to an FFT 1404. A demultiplexer 1406 may then separate the multiplexed information signals from one another. The information signals may then be de-scrambled 1408, and a demodulation block 1410 may then demodulate the information signals. As described above, in this example, channel estimation is not needed for differential demodulation. Accordingly, receiver complexity may be reduced relative to a receiver implementing coherent modulation. The scheduled entity may then send demodulated information bits to a decoding block 1412, which may perform bit-level decoding to recover the payload of the broadcast control channel.

Figure 15:
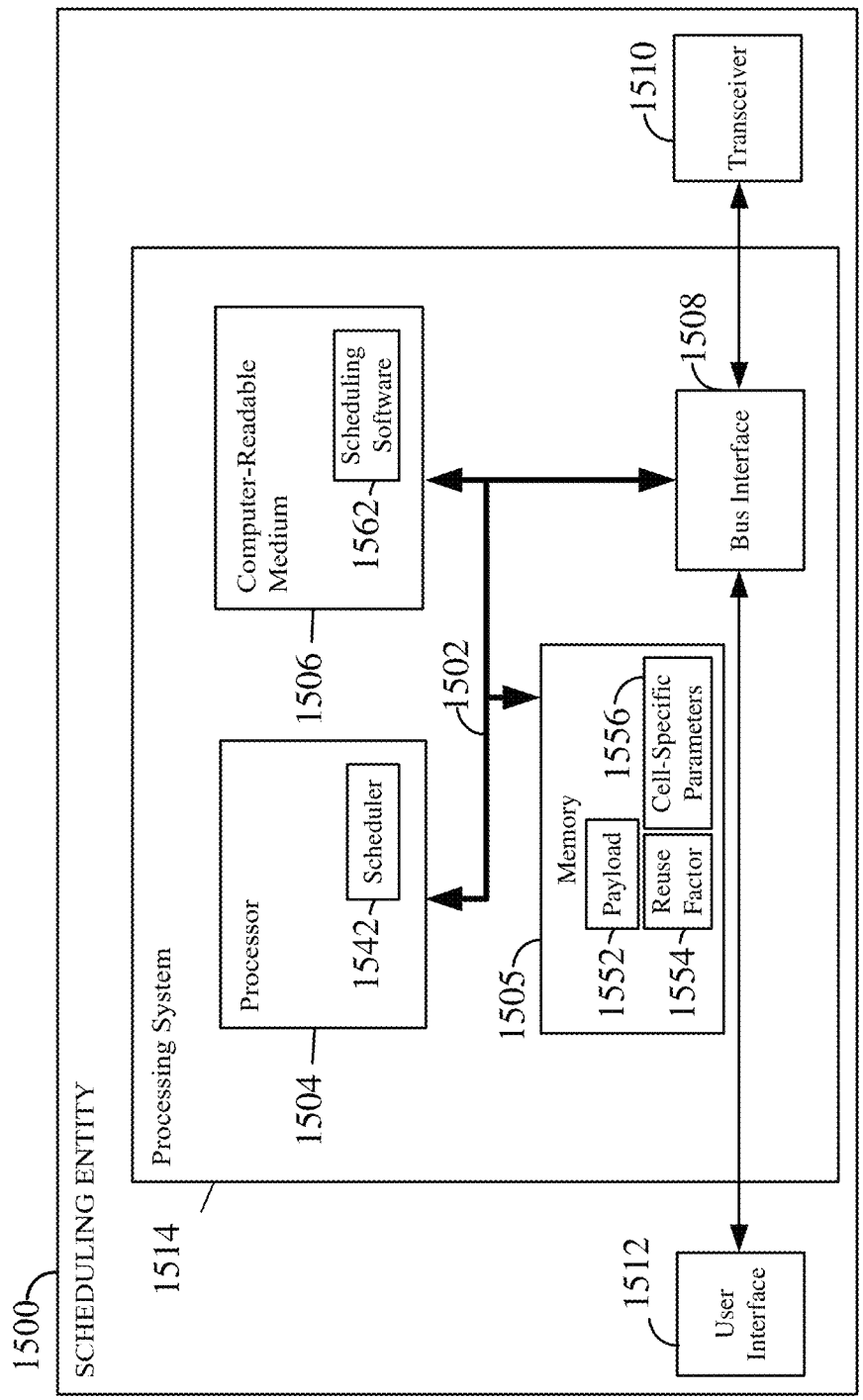
FIG. 15 is a block diagram illustrating an example of a hardware implementation for a scheduling entity employing a processing system.

FIG. 15 is a block diagram illustrating an example of a hardware implementation for a scheduling entity 1500 employing a processing system 1514. For example, the scheduling entity 1500 may be a user equipment (UE) as illustrated in any one or more of FIGS. 1 and/or 2. In another example, the scheduling entity 1500 may be a base station as illustrated in any one or more of FIGS. 1, 2, 7, and/or 8.

The scheduling entity 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1500 may be configured to perform any one or more of the functions described herein. That is, the processor 1504, as utilized in a scheduling entity 1500, may be used to implement any one or more of the processes and procedures described below and illustrated in FIGS. 17 and/or 18.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The memory 1505 may store one or more data including but not limited to a payload 1552, a reuse factor 1554, and/or any number of cell-specific parameters 1556. The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510. The transceiver 1510 provides a communication interface or means for communicating with various other apparatus over a transmission medium, including but not limited to a shared spectrum carrier. For example, the transceiver 1510 may be configured for transmitting downlink control information in one or more slots on the shared spectrum carrier, where the downlink control information may include a unicast control channel multiplexed with a broadcast control channel. The transceiver 1510 may further be configured for applying differential modulation, sequence-based modulation, and/or coherent modulation to common control information transmitted on the broadcast control channel. The transceiver 1510 may still further be configured for precoding a unicast control channel portion of the downlink control information without precoding the broadcast control channel. The transceiver 1510 may be configured to coordinate with the processor 1504 to implement one or more of the functional blocks described above and illustrated in FIGS. 5, 7, 8, 9, 11, and/or 13. The transceiver 1510 may further be configured to implement one or more of the processes and/or procedures described below and illustrated in FIG. 17. Depending upon the nature of the apparatus, a user interface 1512 (e.g., keypad, display, speaker, microphone, joystick) may also be provided. Of course, such a user interface 1512 is optional, and may be omitted in some examples, such as a base station.

In some aspects of the disclosure, the processor 1504 may include a scheduler 1542 configured for various functions, including, for example, determining a set of PRBs for carrying a broadcast control channel portion of the downlink control information. For example, the scheduler 1542 may be configured to implement one or more of the functions described below in relation to FIG. 17, including, e.g., block 1702. The processor 1504 may further be configured to coordinate with the transceiver 1510 to implement any one or more of the functional blocks described above and illustrated in FIGS. 9, 11, and/or 13.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506. The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1506 may include scheduling software 1562 configured for various functions, including, for example, determining a set of PRBs for carrying a broadcast control channel portion of the downlink control information. For example, the scheduling software 1562 may be configured to implement one or more of the functions described below in relation to FIG. 17, including, e.g., block 1702. The computer-readable medium 1506 may further include instructions for coordinating with the transceiver 1510 to implement one or more of the functional blocks described above and illustrated in FIGS. 9, 11, and/or 13.

In one configuration, the apparatus 1500 for wireless communication includes means for transmitting downlink control information on a shared spectrum carrier; means for applying differential modulation, sequence-based modulation, and/or coherent modulation to at least a portion of the downlink control information; and means for precoding a unicast control channel portion of the downlink control information without precoding the broadcast control channel. In one aspect, the aforementioned means may be the transceiver 1510 shown in FIG. 15 configured to perform the functions recited by the aforementioned means.

In a further configuration, the apparatus 1500 for wireless communication includes means for determining a set of PRBs for carrying a broadcast control channel portion of the downlink control information. In one aspect, the aforementioned means may be the processor 1504 shown in FIG. 15. In another aspect, the aforementioned means may the scheduler 1542, or any other suitable circuit or apparatus configured to perform the functions recited by the aforementioned means.

Figure 17:
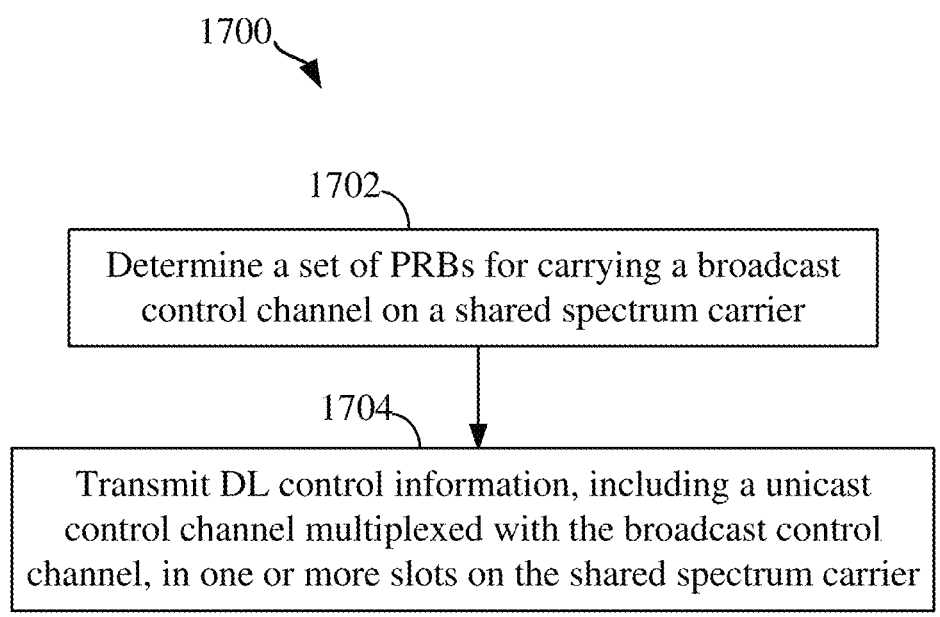
FIG. 17 is a flow chart illustrating a process for a scheduling entity to generate and transmit a broadcast control channel over a shared spectrum carrier according to various example aspects of the disclosure.

Of course, in the above examples, the circuitry included in the transceiver 1510 and the processor 1504 is merely provided as an example, and other means for carrying out the described functions may be included within various aspects of the present disclosure, including but not limited to the instructions stored in the computer-readable storage medium 1506, or any other suitable apparatus or means described in any one of the FIGS. 1, 2, 5, 9, 11, and/or 13, and utilizing, for example, the processes and/or algorithms described herein in relation to FIGS. 7, 8, 17, and/or 18.

Figure 16:
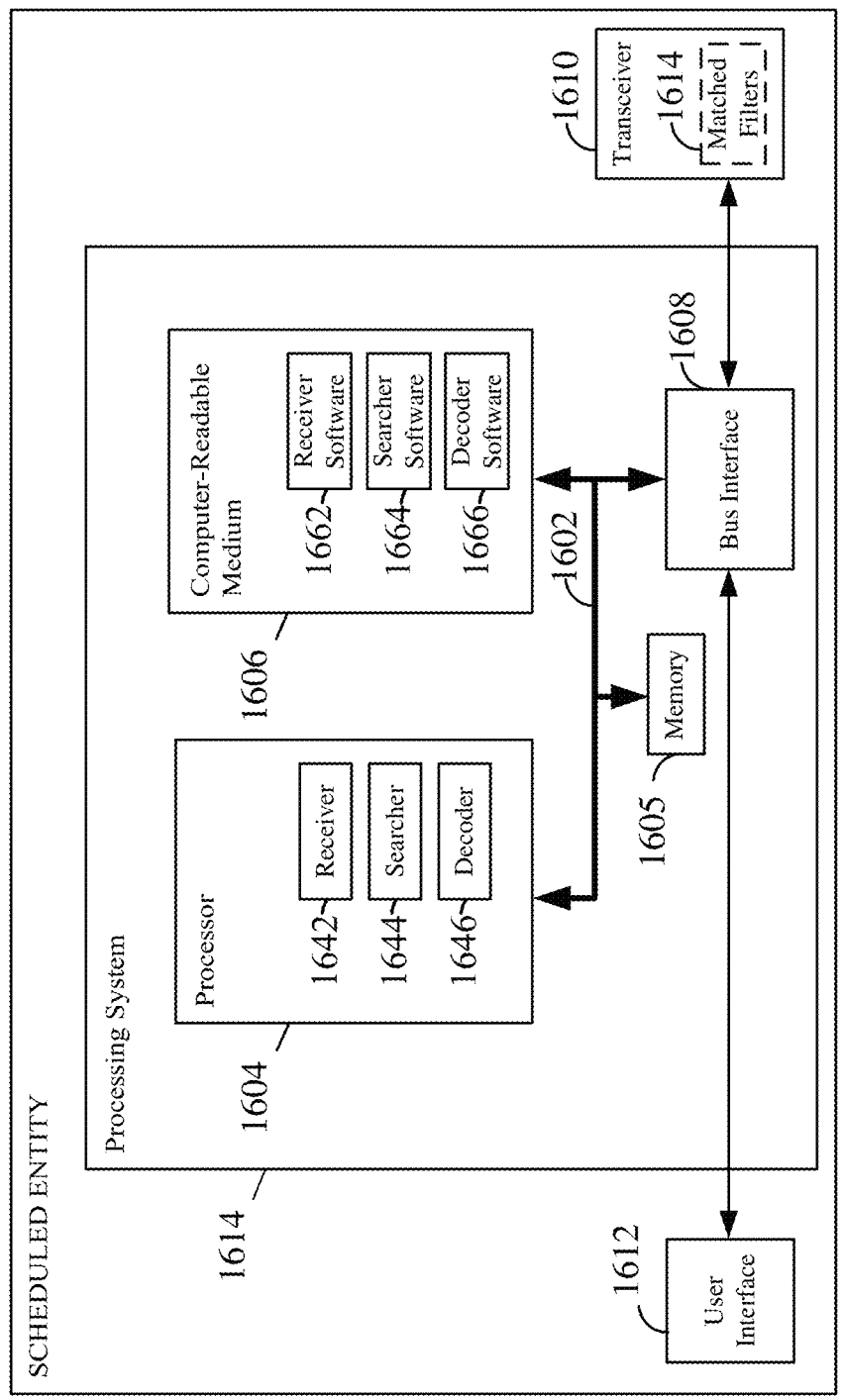
FIG. 16 is a block diagram illustrating an example of a hardware implementation for a scheduled entity employing a processing system.

FIG. 16 is a conceptual diagram illustrating an example of a hardware implementation for an exemplary scheduled entity 1600 employing a processing system 1614. In accordance with various aspects of the disclosure, an element, or any portion of an element, or any combination of elements may be implemented with a processing system 1614 that includes one or more processors 1604. For example, the scheduled entity 1600 may be a user equipment (UE) as illustrated in any one or more of FIGS. 1 and/or 2.

The processing system 1614 may be substantially the same as the processing system 1514 illustrated in FIG. 15, including a bus interface 1608, a bus 1602, memory 1605, a processor 1604, and a computer-readable medium 1606. Furthermore, the scheduled entity 1600 may include a user interface 1612 and a transceiver 1610 substantially similar to those described above in FIG. 15. For example, the transceiver 1610 may be configured for receiving a unicast control channel multiplexed with a broadcast control channel over one or more slots on the shared spectrum carrier. The transceiver 1610 may further be configured for applying differential demodulation, sequence-based demodulation, and/or coherent demodulation to received symbols of the broadcast control channel. In an example corresponding to sequence-based demodulation, the transceiver 1610 may include a set of matched filters 1614 corresponding to a set of predetermined base sequences, each of the matched filters 1614 configured to output a likelihood that received symbols of the broadcast control channel corresponds to its respective base sequence. The transceiver 1610 may further be configured to coordinate with the processor 1604 to implement one or more of the functional blocks described above and illustrated in FIGS. 10, 12, and/or 14. The transceiver 1610 may further be configured to implement one or more of the functions described below in relation to FIG. 18, e.g., at blocks 1804-1806.

In some aspects of the disclosure, the processor 1604 may include receiving circuitry 1642 configured for various functions, including, for example, utilizing the transceiver 1610 to receive at least one CCE directed to a specific receiving device over a unicast control channel, and to receive common control information relating to access control for the shared spectrum carrier over a broadcast control channel. For example, the receiving circuitry 1642 may be configured to implement one or more of the functions described below in relation to FIG. 18, e.g., at block 1806. The processor 1604 may further include search circuitry 1644 configured for various functions, including, for example, utilizing the transceiver 1610 to determine a set of PRBs corresponding to a shared search space on the shared spectrum carrier. For example, the search circuitry 1644 may be configured to implement one or more of the functions described below in relation to FIG. 18, e.g., at block 1802. The processor 1604 may further include decoder circuitry 1646 configured for various functions, including, for example, determining common control information on the broadcast control channel based on maximum likelihood (ML) decoding of outputs of the matched filters 1614. For example, the decoder circuitry 1646 may be configured to implement one or more of the functions described below in relation to FIG. 18, e.g., at blocks 1804-1806. The processor 1604 may further be configured to coordinate with the transceiver 1610 to implement one or more of the functional blocks described above and illustrated in FIGS. 10, 12, and/or 14. That is, the processor 1604, as utilized in a scheduled entity 1600, may be used to implement any one or more of the processes described below and illustrated in FIG. 18.

In one or more examples, the computer-readable storage medium 1606 may include receiver software 1662 configured for various functions, including, for example, determining a set of PRBs for carrying a broadcast control channel portion of the downlink control information. For example, the scheduling software 1562 may be configured to implement one or more of the functions described below in relation to FIG. 17, including, e.g., block 1702. The computer-readable medium 1506 may further include instructions for coordinating with the transceiver 1510 to implement one or more of the functional blocks described above and illustrated in FIGS. 9, 11, and/or 13.

In one configuration, the apparatus 1600 for wireless communication includes means for monitoring a shared search space on a shared spectrum carrier, means for receiving a unicast control channel multiplexed with a broadcast control channel on a shared spectrum carrier, and means for applying differential demodulation, sequence-based demodulation, and/or coherent demodulation to received symbols of the broadcast control channel. In one aspect, the aforementioned means may be the transceiver 1610 shown in FIG. 16 configured to perform the functions recited by the aforementioned means. In another aspect, the aforementioned means may be the processor 1604 shown in FIG. 16 configured to perform the functions recited by the aforementioned means. In another aspect, the aforementioned means may be any suitable circuit or apparatus configured to perform the functions recited by the aforementioned means.

In a further configuration, the apparatus 1600 for wireless communication includes means for receiving at least one control channel element directed to a specific receiving device over a unicast control channel, and to receive common control information relating to access control for the shared spectrum carrier over the broadcast control channel. The apparatus 1600 for wireless communication may further include means for determining a set of PRBs corresponding to a shared search space on the shared spectrum carrier. In one aspect, the aforementioned means may be the processor 1604 shown in FIG. 16 configured to perform the functions recited by the aforementioned means. In another aspect, the aforementioned means may be any suitable circuit or apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 2, 5, 10, 12, and/or 14, and utilizing, for example, the processes and/or algorithms described herein in relation to FIGS. 7, 8, 17, and/or 18.

FIG. 17 is a flow chart illustrating an exemplary process 1700 for wireless communication over a shared spectrum carrier in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the scheduling entity 1500 illustrated in FIG. 15. In some examples, the process 1700 may be carried out by any suitable apparatus or means for carrying out the functions or algorithm described below.

At block 1702, the scheduling entity 1500 (e.g., at the scheduler 1542) may determine a set of PRBs for carrying a broadcast control channel on the shared spectrum carrier. The allocation of PRBs for the broadcast control channel may correspond to a distributed search space, distributed across the system bandwidth of the shared spectrum carrier; or to a localized search space, being contiguous with one another in a group that spans only a portion of the system bandwidth of the shared spectrum carrier. Further, the allocation of PRBs for the broadcast control channel may be based on cell-specific information corresponding to the scheduling entity, such as a cell ID, the system bandwidth for that cell, a subframe number, etc. The allocation may further be based on non-cell-specific parameters, such as a reuse factor. Each PRB in the set of PRBs may be located relative to a starting PRB, which has a PRB index based on the cell ID x of the scheduling entity 1500, modulo the reuse factor r (x mod r). In some examples, the starting PRB may be offset using frequency hopping. Here, the frequency hopping offset may be a function of one or more parameters, including but not limited to the subframe number and system bandwidth.

At block 1704, the scheduling entity 1500 (e.g., at the transceiver 1510) may transmit DL control information, including a unicast control channel multiplexed with a broadcast control channel, in one or more slots on the shared spectrum carrier. Here, the scheduling entity 1500 may precode the unicast control channel for beamforming or MIMO, while omitting precoding of the broadcast control channel. For transmission of the broadcast control channel, the scheduling entity 1500 may apply coherent modulation, differential modulation, sequence-based modulation, etc. For sequence-based modulation, the scheduling entity 1500 may map a set of bits corresponding to the common control information to a concatenation of base sequences, which are selected from among a plurality of base sequences and satisfy a coding constraint, for transmission of the common control information. The unicast control channel may generally include one or more CCEs directed to a specific receiving device, such as a scheduled entity 1600. The broadcast control channel may include common control information, which may generally be related to access control for the shared spectrum carrier. With respect to the broadcast control channel, the common control information may include sensing information relating to the shared spectrum carrier, reservation information for the shared spectrum carrier, a sharing status of the shared spectrum carrier, etc. In some examples, the common control information may include a duplexing mode of the shared spectrum carrier; link direction information for one or more slots on the shared spectrum carrier; an almost-blank indicator for one or more slots on the shared spectrum carrier; numerology information for the shared spectrum carrier; an information element relating to one or more system information blocks that characterize the shared spectrum carrier; or some combination of any number of these parameters.

Figure 18:
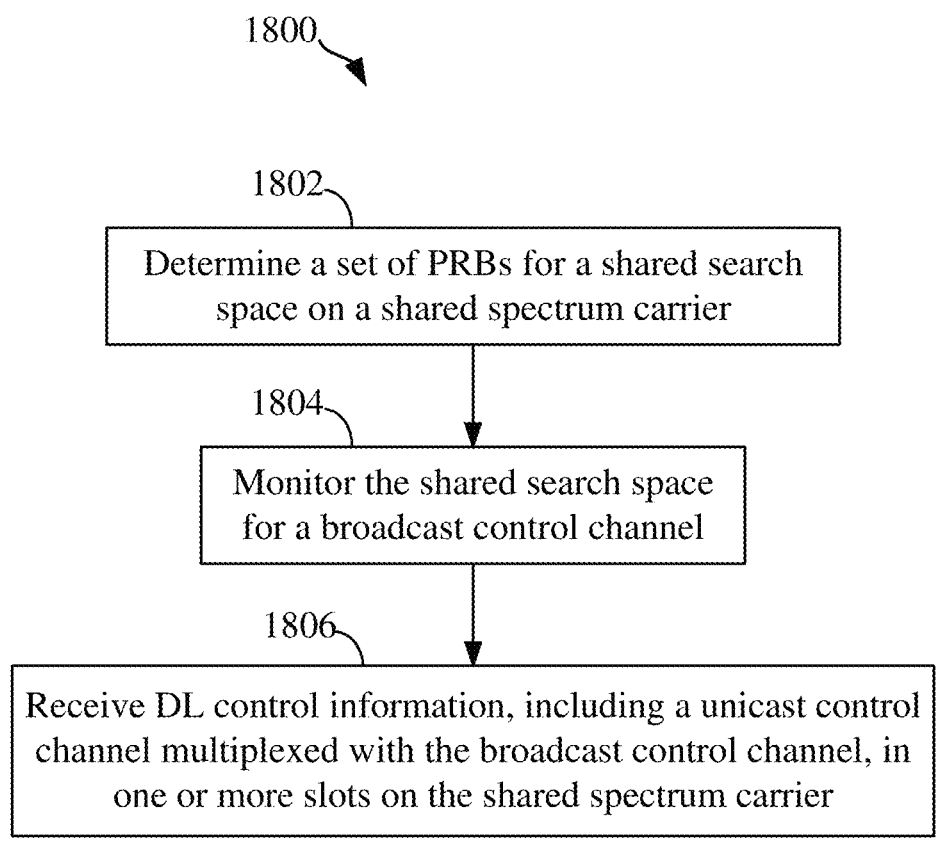
FIG. 18 is a flow chart illustrating a process for a scheduled entity to receive a broadcast control channel over a shared spectrum carrier according to various example aspects of the disclosure.

FIG. 18 is a flow chart illustrating an exemplary process 1800 for wireless communication with a cell over a shared spectrum carrier in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the scheduled entity 1600 illustrated in FIG. 16. In some examples, the process 1800 may be carried out by any suitable apparatus or means for carrying out the functions or algorithm described below.

At block 1802, the scheduled entity 1600 may determine a set of PRBs corresponding to a shared search space on the shared spectrum carrier. The allocation of PRBs for the broadcast control channel may correspond to a distributed search space, distributed across the system bandwidth of the shared spectrum carrier; or to a localized search space, being contiguous with one another in a group that spans only a portion of the system bandwidth of the shared spectrum carrier. Further, the allocation of PRBs for the broadcast control channel may be based on cell-specific information corresponding to the cell, such as a cell ID, the system bandwidth for that cell, a subframe number, etc. The allocation may further be based on non-cell-specific parameters, such as a reuse factor. Each PRB in the set of PRBs may be located relative to a starting PRB, which has a PRB index based on the cell ID x of the scheduling entity 1500, modulo the reuse factor r (x mod r). In some examples, the starting PRB may be offset using frequency hopping. Here, the frequency hopping offset may be a function of one or more parameters, including but not limited to the subframe number and system bandwidth.

At block 1804, the scheduled entity 1600 (e.g., at the transceiver 1610) may monitor the shared search space on the shared spectrum carrier for the broadcast control channel. At block 1806, the scheduled entity 1600 (e.g., at the transceiver 1610) may receive DL control information, including a unicast control channel multiplexed with a broadcast control channel, in one or more slots on the shared spectrum carrier. For receiving the broadcast control channel, the scheduled entity 1600 may apply coherent demodulation, differential demodulation, sequence-based demodulation, etc. For sequence-based demodulation, the scheduled entity 1600 may apply a set of matched filters, corresponding to a set of predetermined base sequences, to received symbols of the broadcast control channel. Accordingly, the scheduled entity 1600 may determine the common control information based on maximum likelihood (ML) decoding of outputs of the matched filters. The unicast control channel may generally include one or more CCEs directed to a specific receiving device, such as the scheduled entity 1600. The broadcast control channel may include common control information, which may generally be related to access control for the shared spectrum carrier. With respect to the broadcast control channel, the common control information may include sensing information relating to the shared spectrum carrier, reservation information for the shared spectrum carrier, a sharing status of the shared spectrum carrier, etc. In some examples, the common control information may include a duplexing mode of the shared spectrum carrier; link direction information for one or more slots on the shared spectrum carrier; an almost-blank indicator for one or more slots on the shared spectrum carrier; numerology information for the shared spectrum carrier; an information element relating to one or more system information blocks that characterize the shared spectrum carrier; or some combination of any number of these parameters.

Several aspects of a wireless communication network have been presented with reference to an exemplary implementation in a 5G NR network. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication over a shared spectrum carrier, the method operable at a scheduling entity, the method comprising:
  transmitting downlink control information on the shared spectrum carrier, the downlink control information comprising:
    a unicast physical downlink control channel (PDCCH) comprising at least one control channel element directed to a specific receiving device; and
    a broadcast PDCCH comprising common control information relating to access control for the shared spectrum carrier, wherein the common control information comprises sensing information relating to the shared spectrum carrier, reservation information for the shared spectrum carrier, a wake-up signal configured to change an operating mode of a receiving device from an idle mode to a connected mode, a sharing status of the shared spectrum carrier, or some combination thereof;

wherein the unicast PDCCH and the broadcast PDCCH are multiplexed together in a single downlink control region of a slot on the shared spectrum carrier, wherein a power of the broadcast PDCCH is boosted relative to the unicast PDCCH prior to multiplexing.

2. The method of claim 1, further comprising applying differential modulation for transmission of the broadcast PDCCH.

3. The method of claim 1, further comprising mapping a set of bits corresponding to the common control information to a concatenation of base sequences in a time domain or frequency domain, which are selected from among a plurality of base sequences and satisfy a forward error correction (FEC) coding constraint, for transmission of the common control information.

4. The method of claim 1, further comprising: determining a set of physical resource blocks (PRBs) for carrying the broadcast PDCCH, the set of PRBs being contiguous with one another in a group spanning a portion of a system bandwidth of the shared spectrum carrier.

5. The method of claim 4, wherein each PRB in the set of PRBs is located relative to a starting PRB having a PRB index, the method further comprising:
determining the PRB index of the starting PRB based on a frequency hopping offset.

6. The method of claim 1, further comprising:
concurrently precoding the unicast PDCCH for beamforming or multi-input multi-output (MIMO) transmission while omitting precoding of the broadcast PDCCH.

7. The method of claim 1, wherein the unicast PDCCH and the broadcast PDCCH are multiplexed together in a same symbol in the single downlink control region of the slot on the shared spectrum carrier.

8. The method of claim 1, wherein the slot is front-loaded with the broadcast PDCCH.

9. An apparatus configured for wireless communication over a shared spectrum carrier, the apparatus comprising:
a transceiver configured for transmitting a unicast physical downlink control channel (PDCCH) multiplexed with a broadcast PDCCH in a single downlink control region of a slot on the shared spectrum carrier, wherein a power of the broadcast PDCCH is to be boosted relative to the unicast PDCCH prior to multiplexing; and
a processor communicatively coupled to the transceiver, wherein the processor is configured to utilize the transceiver to send at least one control channel element directed to a specific receiving device over the unicast PDCCH, and to broadcast common control information relating to access control for the shared spectrum carrier over the broadcast PDCCH, wherein the common control information comprises sensing information relating to the shared spectrum carrier, reservation information for the shared spectrum carrier, a wake-up signal configured to change an operating mode of a receiving device from an idle mode to a connected mode, a sharing status of the shared spectrum carrier, or some combination thereof.

10. The apparatus of claim 9, wherein the transceiver is further configured for applying differential modulation for transmission of the broadcast PDCCH.

11. The apparatus of claim 9, wherein the processor is further configured for mapping a set of bits corresponding to the common control information to a concatenation of base sequences in a time domain or frequency domain, which are selected from among a plurality of base sequences and satisfy a forward error correction (FEC) coding constraint, for transmission of the common control information.

12. The apparatus of claim 9, further comprising a scheduler configured for determining a set of physical resource blocks (PRBs) for carrying the broadcast PDCCH, the set of PRBs being contiguous with one another in a group spanning a portion of a system bandwidth of the shared spectrum carrier.

13. The apparatus of claim 12, wherein each PRB in the set of PRBs is located relative to a starting PRB having a PRB index, and wherein the scheduler is further configured for determining the PRB index of the starting PRB based on a frequency hopping offset.

14. The apparatus of claim 9, wherein the transceiver is further configured for concurrently precoding the unicast PDCCH for beamforming or multi-input multi-output (MIMO) transmission while omitting precoding of the broadcast PDCCH.

15. The apparatus of claim 9, wherein the unicast PDCCH and the broadcast PDCCH are multiplexed together in a same symbol in the single downlink control region of the slot on the shared spectrum carrier.

16. The apparatus of claim 9, wherein the slot is to be front-loaded with the broadcast PDCCH.

17. A method of wireless communication with a cell over a shared spectrum carrier, the method operable at a scheduled entity, the method comprising:
receiving downlink control information on the shared spectrum carrier, the downlink control information comprising:
a unicast physical downlink control channel (PDCCH) comprising at least one control channel element directed to a specific receiving device; and
a broadcast PDCCH comprising common control information relating to access control for the shared spectrum carrier, wherein the common control information comprises sensing information relating to the shared spectrum carrier, reservation information for the shared spectrum carrier, a wake-up signal configured to cause a change from an idle mode to a connected mode, a sharing status of the shared spectrum carrier, or some combination thereof,
wherein the unicast PDCCH and the broadcast PDCCH are multiplexed together in a single downlink control region of a slot on the shared spectrum carrier, wherein a power of the broadcast PDCCH is boosted relative to the unicast PDCCH prior to multiplexing.

18. The method of claim 17, wherein the common control information comprises a duplexing mode of the shared spectrum carrier, link direction information for one or more slots on the shared spectrum carrier, an almost-blank indicator for one or more slots on the shared spectrum carrier, numerology information for the shared spectrum carrier, an information element relating to one or more system information blocks that characterize the shared spectrum carrier, or some combination thereof.

19. The method of claim 17, further comprising applying differential demodulation to received symbols of the broadcast PDCCH.

20. The method of claim 17, further comprising applying a set of matched filters, corresponding to a set of predetermined base sequences, to received symbols of the broadcast PDCCH; and
determining the common control information based on maximum likelihood (ML) decoding of outputs of the matched filters.

21. The method of claim 17, further comprising:
   determining a set of physical resource blocks (PRBs) corresponding to a shared search space on the shared spectrum carrier, the set of PRBs based on cell-specific information for the cell; and
   monitoring the shared search space on the shared spectrum carrier for the broadcast PDCCH.

22. The method of claim 21, wherein each PRB in the set of PRBs is located relative to a starting PRB having a PRB index based on: a cell ID of the cell, modulo a reuse factor; based on a frequency hopping offset; or some combination thereof.

23. The method of claim 17, further comprising:
   determining a set of physical resource blocks (PRBs) corresponding to a shared search space on the shared spectrum carrier, the set of PRBs being contiguous with one another in a group spanning a portion of a system bandwidth of the shared spectrum carrier; and
   monitoring the shared search space on the shared spectrum carrier for the broadcast PDCCH.

24. The method of claim 17, wherein the unicast PDCCH and the broadcast PDCCH are multiplexed together in a same symbol in the single downlink control region of the slot on the shared spectrum carrier.

25. An apparatus configured for wireless communication over a shared spectrum carrier, the apparatus comprising:
   a transceiver configured for receiving a unicast physical downlink control channel (PDCCH) multiplexed with a broadcast PDCCH in a single downlink control region of a slot on the shared spectrum carrier, wherein a power of the broadcast PDCCH is to be boosted relative to the unicast PDCCH prior to multiplexing; and
   a processor communicatively coupled to the transceiver, wherein the processor is configured to utilize the transceiver to receive at least one control channel element directed to a specific receiving device over the unicast PDCCH, and to receive common control information relating to access control for the shared spectrum carrier over the broadcast PDCCH, wherein the common control information comprises sensing information relating to the shared spectrum carrier, reservation information for the shared spectrum carrier, a wake-up signal configured to initiate a change from an idle mode to a connected mode, a sharing status of the shared spectrum carrier, or some combination thereof.

26. The apparatus of claim 25, wherein the common control information comprises a duplexing mode of the shared spectrum carrier, link direction information for one or more slots on the shared spectrum carrier, an almost-blank indicator for one or more slots on the shared spectrum carrier, numerology information for the shared spectrum carrier, an information element relating to one or more system information blocks that characterize the shared spectrum carrier, or some combination thereof.

27. The apparatus of claim 25, wherein the transceiver is further configured for applying differential demodulation to received symbols of the broadcast PDCCH.

28. The apparatus of claim 25, further comprising:
   a set of matched filters corresponding to a set of predetermined base sequences, each of the matched filters configured to output a likelihood that received symbols of the broadcast PDCCH corresponds to its respective base sequence; and
   a decoder for determining the common control information based on a maximum of the respective likelihoods output from the set of matched filters.

29. The apparatus of claim 25, wherein the processor is further configured for:
   determining a set of physical resource blocks (PRBs) corresponding to a shared search space on the shared spectrum carrier, the set of PRBs based on cell-specific information for a cell; and
   utilizing the transceiver for monitoring the shared search space on the shared spectrum carrier for the broadcast PDCCH.

30. The apparatus of claim 29, wherein each PRB in the set of PRBs is located relative to a starting PRB having a PRB index based on: a cell ID of the cell, modulo a reuse factor; based on a frequency hopping offset; or some combination thereof.

31. The apparatus of claim 25, wherein the processor is further configured for:
   determining a set of physical resource blocks (PRBs) corresponding to a shared search space on the shared spectrum carrier, the set of PRBs being contiguous with one another in a group spanning a portion of a system bandwidth of the shared spectrum carrier; and
   utilizing the transceiver for monitoring the shared search space on the shared spectrum carrier for the broadcast PDCCH.

32. The apparatus of claim 25, wherein the unicast PDCCH and the broadcast PDCCH are multiplexed together in a same symbol in the single downlink control region of the slot on the shared spectrum carrier.

* * * * *